(12) United States Patent
Schwesig et al.

(10) Patent No.: US 10,379,621 B2
(45) Date of Patent: Aug. 13, 2019

(54) GESTURE COMPONENT WITH GESTURE LIBRARY

(71) Applicant: Google Inc., Mountain View, CA (US)

(72) Inventors: Carsten C. Schwesig, San Francisco, CA (US); Ivan Poupyrev, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/286,152

(22) Filed: Oct. 5, 2016

(65) Prior Publication Data

US 2019/0011989 A1 Jan. 10, 2019

Related U.S. Application Data

(60) Provisional application No. 62/237,975, filed on Oct. 6, 2015.

(51) Int. Cl.
*G01S 7/41* (2006.01)
*G01S 13/56* (2006.01)
(Continued)

(52) U.S. Cl.
CPC .............. *G06F 3/017* (2013.01); *G01S 7/41* (2013.01); *G01S 7/415* (2013.01); *G01S 13/56* (2013.01);
(Continued)

(58) Field of Classification Search
CPC .. G06F 3/017; G06F 3/0484; G06F 17/30424; G06F 1/163; G06F 2203/0384;
(Continued)

(56) References Cited

U.S. PATENT DOCUMENTS 3,610,874 A 10/1971 Gagliano
3,752,017 A 8/1973 Lloyd et al.
(Continued)

FOREIGN PATENT DOCUMENTS

CN 1462382 12/2003
CN 101751126 6/2010
(Continued)

OTHER PUBLICATIONS

"Combined Search and Examination Report", GB Application No. 1620891.0, dated May 31, 2017, 9 pages.
(Continued)

*Primary Examiner* — Brent D Castiaux
(74) *Attorney, Agent, or Firm* — Colby Nipper PLLC

(57) ABSTRACT

A gesture component with a gesture library is described. The gesture component is configured to expose operations for execution by application of a computing device based on detected gestures. In one example, an input is detected using a three dimensional object detection system of a gesture component of the computing device. A gesture is recognized by the gesture component based on the detected input through comparison with a library of gestures maintained by the gesture component. An operation is then recognized that corresponds to the gesture by the gesture component using the library of gestures. The operation is exposed by the gesture component via an application programming interface to at least one application executed by the computing device to control performance of the operation by the at least one application.

20 Claims, 8 Drawing Sheets

(51) Int. Cl.
| | |
|---|---|
| *G06F 1/16* | (2006.01) |
| *G06F 3/01* | (2006.01) |
| *G06K 9/62* | (2006.01) |
| *G01S 13/86* | (2006.01) |
| *G06F 16/245* | (2019.01) |
| *G06K 9/00* | (2006.01) |
| *H04Q 9/00* | (2006.01) |
| *G08C 17/02* | (2006.01) |
| *G06F 3/0484* | (2013.01) |

(52) U.S. Cl.
CPC ............ *G01S 13/86* (2013.01); *G01S 13/867* (2013.01); *G06F 16/245* (2019.01); *G06K 9/00201* (2013.01); *G06K 9/629* (2013.01); *G06K 9/6288* (2013.01); *H04Q 9/00* (2013.01); *G06F 1/163* (2013.01); *G06F 3/0484* (2013.01); *G06F 2203/0384* (2013.01); *G08C 17/02* (2013.01); *G08C 2201/93* (2013.01); *H04Q 2209/883* (2013.01)

(58) Field of Classification Search
CPC ........ G06F 16/245; G01S 13/56; G01S 13/86; G01S 13/867; G01S 7/415; G01S 7/41; G06K 9/6288; G06K 9/629; G06K 9/00201; H04Q 9/00; H04Q 2209/883; G08C 17/02; G08C 2201/93
See application file for complete search history.

(56) References Cited

U.S. PATENT DOCUMENTS

| | | |
|---|---|---|
| 3,953,706 A | 4/1976 | Harris et al. |
| 4,104,012 A | 8/1978 | Ferrante |
| 4,654,967 A | 4/1987 | Thenner |
| 4,700,044 A | 10/1987 | Hokanson et al. |
| 4,795,998 A | 1/1989 | Dunbar et al. |
| 4,838,797 A | 6/1989 | Dodier |
| 5,016,500 A | 5/1991 | Conrad et al. |
| 5,121,124 A | 6/1992 | Spivey et al. |
| 5,298,715 A | 3/1994 | Chalco et al. |
| 5,341,979 A | 8/1994 | Gupta |
| 5,410,471 A | 4/1995 | Alyfuku et al. |
| 5,468,917 A | 11/1995 | Brodsky et al. |
| 5,564,571 A | 10/1996 | Zanotti |
| 5,656,798 A | 8/1997 | Kubo et al. |
| 5,724,707 A | 3/1998 | Kirk et al. |
| 5,798,798 A | 8/1998 | Rector et al. |
| 6,032,450 A | 3/2000 | Blum |
| 6,037,893 A | 3/2000 | Lipman |
| 6,080,690 A | 6/2000 | Lebby et al. |
| 6,101,431 A | 8/2000 | Niwa et al. |
| 6,210,771 B1 | 4/2001 | Post et al. |
| 6,254,544 B1 | 7/2001 | Hayashi |
| 6,313,825 B1 | 11/2001 | Gilbert |
| 6,340,979 B1 | 1/2002 | Beaton et al. |
| 6,386,757 B1 | 5/2002 | Konno |
| 6,440,593 B2 | 8/2002 | Ellison et al. |
| 6,492,980 B2 | 12/2002 | Sandbach |
| 6,493,933 B1 | 12/2002 | Post et al. |
| 6,513,833 B2 | 2/2003 | Breed et al. |
| 6,513,970 B1 | 2/2003 | Tabata et al. |
| 6,524,239 B1 | 2/2003 | Reed et al. |
| 6,543,668 B1 | 4/2003 | Fujii et al. |
| 6,616,613 B1 | 9/2003 | Goodman |
| 6,711,354 B2 | 3/2004 | Kameyama |
| 6,717,065 B2 | 4/2004 | Hosaka et al. |
| 6,802,720 B2 | 10/2004 | Weiss et al. |
| 6,833,807 B2 | 12/2004 | Flacke et al. |
| 6,835,898 B2 | 12/2004 | Eldridge et al. |
| 6,854,985 B1 | 2/2005 | Weiss |
| 6,929,484 B2 | 8/2005 | Weiss et al. |
| 6,970,128 B1 | 11/2005 | Dwelly et al. |
| 6,997,882 B1 | 2/2006 | Parker et al. |
| 7,019,682 B1 | 3/2006 | Louberg et al. |
| 7,134,879 B2 | 11/2006 | Sugimoto et al. |
| 7,158,076 B2 | 1/2007 | Fiore et al. |
| 7,164,820 B2 | 1/2007 | Eves et al. |
| 7,194,371 B1 | 3/2007 | McBride et al. |
| 7,205,932 B2 | 4/2007 | Fiore |
| 7,223,105 B2 | 5/2007 | Weiss et al. |
| 7,230,610 B2 | 6/2007 | Jung et al. |
| 7,249,954 B2 | 7/2007 | Weiss |
| 7,266,532 B2 | 9/2007 | Sutton et al. |
| 7,299,964 B2 | 11/2007 | Jayaraman et al. |
| 7,310,236 B2 | 12/2007 | Takahashi et al. |
| 7,317,416 B2 | 1/2008 | Flom et al. |
| 7,348,285 B2 | 3/2008 | Dhawan et al. |
| 7,365,031 B2 | 4/2008 | Swallow et al. |
| 7,421,061 B2 | 9/2008 | Boese et al. |
| 7,462,035 B2 | 12/2008 | Lee et al. |
| 7,528,082 B2 | 5/2009 | Krans et al. |
| 7,544,627 B2 | 6/2009 | Tao et al. |
| 7,578,195 B2 | 8/2009 | DeAngelis et al. |
| 7,644,488 B2 | 1/2010 | Aisenbrey |
| 7,647,093 B2 | 1/2010 | Bojovic et al. |
| 7,670,144 B2 | 3/2010 | Ito et al. |
| 7,677,729 B2 | 3/2010 | Vilser et al. |
| 7,691,067 B2 | 4/2010 | Westbrook et al. |
| 7,698,154 B2 | 4/2010 | Marchosky |
| 7,791,700 B2 | 9/2010 | Bellamy |
| 7,834,276 B2 | 11/2010 | Chou et al. |
| 7,941,676 B2 | 5/2011 | Glaser |
| 7,952,512 B1 | 5/2011 | Delker et al. |
| 7,999,722 B2 | 8/2011 | Beeri et al. |
| 8,062,220 B2 | 11/2011 | Kurtz et al. |
| 8,063,815 B2 | 11/2011 | Valo et al. |
| 8,169,404 B1 | 5/2012 | Boillot |
| 8,179,604 B1 | 5/2012 | Prada Gomez et al. |
| 8,193,929 B1 | 6/2012 | Siu et al. |
| 8,199,104 B2 | 6/2012 | Park et al. |
| 8,282,232 B2 | 10/2012 | Hsu et al. |
| 8,289,185 B2 | 10/2012 | Alonso |
| 8,301,232 B2 | 10/2012 | Albert et al. |
| 8,314,732 B2 | 11/2012 | Oswald et al. |
| 8,334,226 B2 | 12/2012 | Nhan et al. |
| 8,341,762 B2 | 1/2013 | Balzano |
| 8,344,949 B2 | 1/2013 | Moshfeghi |
| 8,367,942 B2 | 2/2013 | Howell et al. |
| 8,475,367 B1 | 7/2013 | Yuen et al. |
| 8,505,474 B2 | 8/2013 | Kang et al. |
| 8,509,882 B2 | 8/2013 | Albert et al. |
| 8,514,221 B2 | 8/2013 | King et al. |
| 8,527,146 B1 | 9/2013 | Jackson et al. |
| 8,549,829 B2 | 10/2013 | Song et al. |
| 8,560,972 B2 | 10/2013 | Wilson |
| 8,562,526 B2 | 10/2013 | Heneghan et al. |
| 8,569,189 B2 | 10/2013 | Bhattacharya et al. |
| 8,614,689 B2 | 12/2013 | Nishikawa et al. |
| 8,655,004 B2 | 2/2014 | Prest et al. |
| 8,700,137 B2 | 4/2014 | Albert |
| 8,758,020 B2 | 6/2014 | Burdea et al. |
| 8,759,713 B2 | 6/2014 | Sheats |
| 8,764,651 B2 | 7/2014 | Tran |
| 8,785,778 B2 | 7/2014 | Streeter et al. |
| 8,790,257 B2 | 7/2014 | Libbus et al. |
| 8,814,574 B2 | 8/2014 | Selby et al. |
| 8,819,812 B1 | 8/2014 | Weber et al. |
| 8,854,433 B1 | 10/2014 | Rafii |
| 8,860,602 B2 | 10/2014 | Nohara et al. |
| 8,921,473 B1 | 12/2014 | Hyman |
| 8,948,839 B1 | 2/2015 | Longinotti-Buitoni et al. |
| 9,055,879 B2 | 6/2015 | Selby et al. |
| 9,093,289 B2 | 7/2015 | Vicard et al. |
| 9,125,456 B2 | 9/2015 | Chow |
| 9,141,194 B1 | 9/2015 | Keyes et al. |
| 9,148,949 B2 | 9/2015 | Guofu et al. |
| 9,229,102 B1 | 1/2016 | Wright et al. |
| 9,230,160 B1 | 1/2016 | Kanter |
| 9,235,241 B2 | 1/2016 | Newham et al. |
| 9,316,727 B2 | 4/2016 | Sentelle et al. |
| 9,331,422 B2 | 5/2016 | Nazzaro et al. |
| 9,335,825 B2 | 5/2016 | Rautiainen et al. |

(56) References Cited

U.S. PATENT DOCUMENTS

| | | |
|---|---|---|
| 9,346,167 B2 | 5/2016 | O'Connor et al. |
| 9,354,709 B1 | 5/2016 | Heller et al. |
| 9,508,141 B2 | 11/2016 | Khachaturian et al. |
| 9,569,001 B2 | 2/2017 | Mistry et al. |
| 9,575,560 B2 | 2/2017 | Poupyrev et al. |
| 9,588,625 B2 | 3/2017 | Poupyrev |
| 9,594,443 B2 | 3/2017 | VanBlon et al. |
| 9,600,080 B2 | 3/2017 | Poupyrev |
| 9,693,592 B2 | 7/2017 | Robinson et al. |
| 9,746,551 B2 | 8/2017 | Scholten et al. |
| 9,766,742 B2 | 9/2017 | Papakostas |
| 9,778,749 B2 | 10/2017 | Poupyrev |
| 9,811,164 B2 | 11/2017 | Poupyrev |
| 9,817,109 B2 | 11/2017 | Saboo et al. |
| 9,837,760 B2 | 12/2017 | Karagozler et al. |
| 9,848,780 B1 | 12/2017 | DeBusschere et al. |
| 9,921,660 B2 | 3/2018 | Poupyrev |
| 9,933,908 B2 | 4/2018 | Poupyrev |
| 9,947,080 B2 | 4/2018 | Nguyen et al. |
| 9,971,414 B2 | 5/2018 | Gollakota et al. |
| 9,971,415 B2 | 5/2018 | Poupyrev et al. |
| 9,983,747 B2 | 5/2018 | Poupyrev |
| 9,994,233 B2 | 6/2018 | Diaz-Jimenez et al. |
| 10,016,162 B1 | 7/2018 | Rogers et al. |
| 10,034,630 B2 | 7/2018 | Lee et al. |
| 10,073,590 B2 | 9/2018 | Dascola et al. |
| 10,080,528 B2 | 9/2018 | DeBusschere et al. |
| 10,082,950 B2 | 9/2018 | Lapp |
| 10,088,908 B1 | 10/2018 | Poupyrev et al. |
| 10,139,916 B2 | 11/2018 | Poupyrev |
| 10,155,274 B2 | 12/2018 | Robinson et al. |
| 10,175,781 B2 | 1/2019 | Karagozler et al. |
| 10,203,763 B1 | 2/2019 | Poupyrev et al. |
| 10,222,469 B1 | 3/2019 | Gillian et al. |
| 10,241,581 B2 | 3/2019 | Lien et al. |
| 10,268,321 B2 | 4/2019 | Poupyrev |
| 10,285,456 B2 | 5/2019 | Poupyrev et al. |
| 10,300,370 B1 | 5/2019 | Amihood et al. |
| 2001/0035836 A1 | 11/2001 | Miceli et al. |
| 2002/0009972 A1 | 1/2002 | Amento et al. |
| 2002/0080156 A1 | 6/2002 | Abbott et al. |
| 2002/0170897 A1 | 11/2002 | Hall |
| 2003/0005030 A1 | 1/2003 | Sutton et al. |
| 2003/0071750 A1 | 4/2003 | Benitz |
| 2003/0093000 A1 | 5/2003 | Nishio et al. |
| 2003/0100228 A1 | 5/2003 | Bungo et al. |
| 2003/0119391 A1 | 6/2003 | Swallow et al. |
| 2003/0122677 A1 | 7/2003 | Kail |
| 2004/0009729 A1 | 1/2004 | Hill et al. |
| 2004/0102693 A1 | 5/2004 | Jenkins |
| 2004/0249250 A1 | 12/2004 | McGee et al. |
| 2004/0259391 A1 | 12/2004 | Jung et al. |
| 2005/0069695 A1 | 3/2005 | Jung et al. |
| 2005/0128124 A1 | 6/2005 | Greneker et al. |
| 2005/0148876 A1 | 7/2005 | Endoh et al. |
| 2005/0231419 A1 | 10/2005 | Mitchell |
| 2005/0267366 A1 | 12/2005 | Murashita et al. |
| 2006/0035554 A1 | 2/2006 | Glaser et al. |
| 2006/0040739 A1 | 2/2006 | Wells |
| 2006/0047386 A1 | 3/2006 | Kanevsky et al. |
| 2006/0061504 A1 | 3/2006 | Leach, Jr. et al. |
| 2006/0125803 A1 | 6/2006 | Westerman et al. |
| 2006/0136997 A1 | 6/2006 | Telek et al. |
| 2006/0139162 A1 | 6/2006 | Flynn |
| 2006/0139314 A1 | 6/2006 | Bell |
| 2006/0148351 A1 | 7/2006 | Tao et al. |
| 2006/0157734 A1 | 7/2006 | Onodero et al. |
| 2006/0166620 A1 | 7/2006 | Sorensen |
| 2006/0170584 A1 | 8/2006 | Romero et al. |
| 2006/0209021 A1 | 9/2006 | Yoo et al. |
| 2006/0258205 A1 | 11/2006 | Locher et al. |
| 2006/0284757 A1 | 12/2006 | Zemany |
| 2007/0024488 A1 | 2/2007 | Zemany et al. |
| 2007/0026695 A1 | 2/2007 | Lee et al. |
| 2007/0027369 A1 | 2/2007 | Pagnacco et al. |
| 2007/0118043 A1 | 5/2007 | Oliver et al. |
| 2007/0161921 A1 | 7/2007 | Rausch |
| 2007/0164896 A1 | 7/2007 | Suzuki et al. |
| 2007/0176821 A1 | 8/2007 | Flom et al. |
| 2007/0192647 A1 | 8/2007 | Glaser |
| 2007/0197115 A1 | 8/2007 | Eves et al. |
| 2007/0197878 A1 | 8/2007 | Shklarski |
| 2007/0210074 A1 | 9/2007 | Maurer et al. |
| 2007/0237423 A1 | 10/2007 | Tico et al. |
| 2008/0001735 A1 | 1/2008 | Tran |
| 2008/0002027 A1 | 1/2008 | Kondo et al. |
| 2008/0015422 A1 | 1/2008 | Wessel |
| 2008/0024438 A1 | 1/2008 | Collins et al. |
| 2008/0039731 A1 | 2/2008 | McCombie et al. |
| 2008/0059578 A1 | 3/2008 | Albertson et al. |
| 2008/0065291 A1 | 3/2008 | Breed |
| 2008/0134102 A1 | 6/2008 | Movold et al. |
| 2008/0136775 A1 | 6/2008 | Conant |
| 2008/0168396 A1 | 7/2008 | Matas et al. |
| 2008/0194204 A1 | 8/2008 | Duet et al. |
| 2008/0194975 A1 | 8/2008 | MacQuarrie et al. |
| 2008/0211766 A1 | 9/2008 | Westerman et al. |
| 2008/0233822 A1 | 9/2008 | Swallow et al. |
| 2008/0278450 A1 | 11/2008 | Lashina |
| 2008/0282665 A1 | 11/2008 | Speleers |
| 2008/0291158 A1 | 11/2008 | Park et al. |
| 2008/0303800 A1 | 12/2008 | Elwell |
| 2008/0316085 A1 | 12/2008 | Rofougaran et al. |
| 2008/0320419 A1 | 12/2008 | Matas et al. |
| 2009/0018408 A1 | 1/2009 | Ouchi et al. |
| 2009/0018428 A1 | 1/2009 | Dias et al. |
| 2009/0033585 A1 | 2/2009 | Lang |
| 2009/0053950 A1 | 2/2009 | Surve |
| 2009/0056300 A1 | 3/2009 | Chung et al. |
| 2009/0058820 A1 | 3/2009 | Hinckley |
| 2009/0113298 A1 | 4/2009 | Jung et al. |
| 2009/0115617 A1 | 5/2009 | Sano et al. |
| 2009/0118648 A1 | 5/2009 | Kandori et al. |
| 2009/0149036 A1 | 6/2009 | Lee et al. |
| 2009/0177068 A1 | 7/2009 | Stivoric et al. |
| 2009/0203244 A1 | 8/2009 | Toonder et al. |
| 2009/0226043 A1 | 9/2009 | Angell et al. |
| 2009/0253585 A1 | 10/2009 | Diatchenko et al. |
| 2009/0270690 A1 | 10/2009 | Roos et al. |
| 2009/0278915 A1 | 11/2009 | Kramer et al. |
| 2009/0288762 A1 | 11/2009 | Wolfel |
| 2009/0295712 A1 | 12/2009 | Ritzau |
| 2009/0319181 A1 | 12/2009 | Khosravy et al. |
| 2010/0045513 A1 | 2/2010 | Pett et al. |
| 2010/0050133 A1 | 2/2010 | Nishihara et al. |
| 2010/0053151 A1 | 3/2010 | Marti et al. |
| 2010/0060570 A1 | 3/2010 | Underkoffler et al. |
| 2010/0065320 A1 | 3/2010 | Urano |
| 2010/0069730 A1 | 3/2010 | Bergstrom et al. |
| 2010/0071205 A1 | 3/2010 | Graumann et al. |
| 2010/0094141 A1 | 4/2010 | Puswella |
| 2010/0109938 A1 | 5/2010 | Oswald et al. |
| 2010/0152600 A1 | 6/2010 | Droitcour et al. |
| 2010/0179820 A1 | 7/2010 | Harrison et al. |
| 2010/0198067 A1 | 8/2010 | Mahfouz et al. |
| 2010/0201586 A1 | 8/2010 | Michalk |
| 2010/0204550 A1 | 8/2010 | Heneghan et al. |
| 2010/0205667 A1 | 8/2010 | Anderson et al. |
| 2010/0208035 A1 | 8/2010 | Pinault et al. |
| 2010/0225562 A1 | 9/2010 | Smith |
| 2010/0234094 A1 | 9/2010 | Gagner et al. |
| 2010/0241009 A1 | 9/2010 | Petkie |
| 2010/0002912 A1 | 10/2010 | Solinsky |
| 2010/0281438 A1 | 11/2010 | Latta et al. |
| 2010/0292549 A1 | 11/2010 | Schuler |
| 2010/0306713 A1 | 12/2010 | Geisner et al. |
| 2010/0313414 A1 | 12/2010 | Sheats |
| 2010/0324384 A1 | 12/2010 | Moon et al. |
| 2010/0325770 A1 | 12/2010 | Chung et al. |
| 2011/0003664 A1 | 1/2011 | Richard |
| 2011/0010014 A1 | 1/2011 | Oexman et al. |
| 2011/0018795 A1 | 1/2011 | Jang |
| 2011/0029038 A1 | 2/2011 | Hyde et al. |
| 2011/0073353 A1 | 3/2011 | Lee et al. |

(56) References Cited

U.S. PATENT DOCUMENTS

| | | |
|---|---|---|
| 2011/0083111 A1 | 4/2011 | Forutanpour et al. |
| 2011/0093820 A1 | 4/2011 | Zhang et al. |
| 2011/0118564 A1 | 5/2011 | Sankai |
| 2011/0119640 A1 | 5/2011 | Berkes et al. |
| 2011/0166940 A1 | 7/2011 | Bangera et al. |
| 2011/0181509 A1 | 7/2011 | Rautiainen et al. |
| 2011/0181510 A1* | 7/2011 | Hakala .................... G06F 3/017 345/158 |
| 2011/0193939 A1 | 8/2011 | Vassigh et al. |
| 2011/0197263 A1 | 8/2011 | Stinson, III |
| 2011/0202404 A1 | 8/2011 | van der Riet |
| 2011/0213218 A1 | 9/2011 | Weiner et al. |
| 2011/0221666 A1 | 9/2011 | Newton et al. |
| 2011/0234492 A1 | 9/2011 | Ajmera et al. |
| 2011/0239118 A1 | 9/2011 | Yamaoka et al. |
| 2011/0245688 A1 | 10/2011 | Arora et al. |
| 2011/0279303 A1 | 11/2011 | Smith |
| 2011/0286585 A1 | 11/2011 | Hodge |
| 2011/0303341 A1 | 12/2011 | Meiss et al. |
| 2011/0307842 A1 | 12/2011 | Chiang et al. |
| 2011/0316888 A1 | 12/2011 | Sachs et al. |
| 2011/0318985 A1 | 12/2011 | McDermid |
| 2012/0001875 A1* | 1/2012 | Li ........................ G01S 7/5273 345/177 |
| 2012/0019168 A1 | 1/2012 | Noda et al. |
| 2012/0029369 A1 | 2/2012 | Icove et al. |
| 2012/0047468 A1 | 2/2012 | Santos et al. |
| 2012/0068876 A1 | 3/2012 | Bangera et al. |
| 2012/0092284 A1 | 4/2012 | Rofougaran et al. |
| 2012/0123232 A1 | 5/2012 | Najarian et al. |
| 2012/0127082 A1 | 5/2012 | Kushler et al. |
| 2012/0144934 A1 | 6/2012 | Russell et al. |
| 2012/0150493 A1 | 6/2012 | Casey et al. |
| 2012/0154313 A1 | 6/2012 | Au et al. |
| 2012/0156926 A1 | 6/2012 | Kato et al. |
| 2012/0174299 A1 | 7/2012 | Balzano |
| 2012/0174736 A1 | 7/2012 | Wang et al. |
| 2012/0182222 A1 | 7/2012 | Moloney |
| 2012/0193801 A1 | 8/2012 | Gross et al. |
| 2012/0220835 A1 | 8/2012 | Chung |
| 2012/0248093 A1 | 10/2012 | Ulrich et al. |
| 2012/0254810 A1 | 10/2012 | Heck et al. |
| 2012/0268416 A1 | 10/2012 | Pirogov et al. |
| 2012/0280900 A1 | 11/2012 | Wang et al. |
| 2012/0298748 A1 | 11/2012 | Factor et al. |
| 2012/0310665 A1 | 12/2012 | Xu et al. |
| 2013/0016070 A1 | 1/2013 | Starner et al. |
| 2013/0027218 A1 | 1/2013 | Schwarz et al. |
| 2013/0035563 A1 | 2/2013 | Angellides |
| 2013/0046544 A1 | 2/2013 | Kay et al. |
| 2013/0053653 A1 | 2/2013 | Cuddihy et al. |
| 2013/0078624 A1 | 3/2013 | Holmes et al. |
| 2013/0082922 A1 | 4/2013 | Miller |
| 2013/0083173 A1 | 4/2013 | Geisner et al. |
| 2013/0086533 A1 | 4/2013 | Stienstra |
| 2013/0096439 A1 | 4/2013 | Lee et al. |
| 2013/0102217 A1 | 4/2013 | Jeon |
| 2013/0104084 A1 | 4/2013 | Mlyniec et al. |
| 2013/0113647 A1 | 5/2013 | Sentelle et al. |
| 2013/0113830 A1 | 5/2013 | Suzuki |
| 2013/0117377 A1 | 5/2013 | Miller |
| 2013/0132931 A1 | 5/2013 | Bruns et al. |
| 2013/0147833 A1 | 6/2013 | Aubauer et al. |
| 2013/0150735 A1 | 6/2013 | Cheng |
| 2013/0161078 A1 | 6/2013 | Li |
| 2013/0169471 A1 | 7/2013 | Lynch |
| 2013/0176161 A1 | 7/2013 | Derham et al. |
| 2013/0194173 A1 | 8/2013 | Zhu et al. |
| 2013/0195330 A1 | 8/2013 | Kim et al. |
| 2013/0196716 A1 | 8/2013 | Muhammad |
| 2013/0207962 A1 | 8/2013 | Oberdorfer et al. |
| 2013/0229508 A1 | 9/2013 | Li et al. |
| 2013/0241765 A1 | 9/2013 | Kozma et al. |
| 2013/0245986 A1 | 9/2013 | Grokop et al. |
| 2013/0260630 A1 | 10/2013 | Ito et al. |
| 2013/0278499 A1 | 10/2013 | Anderson |
| 2013/0278501 A1 | 10/2013 | Bulzacki |
| 2013/0283203 A1 | 10/2013 | Batraski et al. |
| 2013/0322729 A1 | 12/2013 | Mestha et al. |
| 2013/0332438 A1 | 12/2013 | Li et al. |
| 2013/0345569 A1 | 12/2013 | Mestha et al. |
| 2014/0005809 A1 | 1/2014 | Frei et al. |
| 2014/0022108 A1 | 1/2014 | Alberth et al. |
| 2014/0028539 A1 | 1/2014 | Newham et al. |
| 2014/0049487 A1 | 2/2014 | Konertz et al. |
| 2014/0050354 A1 | 2/2014 | Heim et al. |
| 2014/0051941 A1 | 2/2014 | Messerschmidt |
| 2014/0070957 A1 | 3/2014 | Longinotti-Buitoni et al. |
| 2014/0072190 A1 | 3/2014 | Wu et al. |
| 2014/0073486 A1 | 3/2014 | Ahmed et al. |
| 2014/0073969 A1 | 3/2014 | Zou et al. |
| 2014/0081100 A1 | 3/2014 | Muhsin et al. |
| 2014/0095480 A1 | 4/2014 | Marantz et al. |
| 2014/0097979 A1 | 4/2014 | Nohara et al. |
| 2014/0121540 A1 | 5/2014 | Raskin |
| 2014/0135631 A1 | 5/2014 | Brumback et al. |
| 2014/0139422 A1 | 5/2014 | Mistry et al. |
| 2014/0139616 A1 | 5/2014 | Pinter et al. |
| 2014/0143678 A1 | 5/2014 | Mistry et al. |
| 2014/0149859 A1 | 5/2014 | Van Dyken et al. |
| 2014/0184496 A1 | 7/2014 | Gribetz et al. |
| 2014/0184499 A1* | 7/2014 | Kim ....................... G08C 17/00 345/156 |
| 2014/0191939 A1 | 7/2014 | Penn et al. |
| 2014/0200416 A1 | 7/2014 | Kashef et al. |
| 2014/0201690 A1 | 7/2014 | Holz |
| 2014/0208275 A1 | 7/2014 | Mongia et al. |
| 2014/0215389 A1 | 7/2014 | Walsh et al. |
| 2014/0239065 A1 | 8/2014 | Zhou et al. |
| 2014/0244277 A1 | 8/2014 | Krishna Rao et al. |
| 2014/0246415 A1 | 9/2014 | Wittkowski |
| 2014/0247212 A1 | 9/2014 | Kim et al. |
| 2014/0250515 A1 | 9/2014 | Jakobsson |
| 2014/0253431 A1 | 9/2014 | Gossweiler et al. |
| 2014/0253709 A1 | 9/2014 | Bresch et al. |
| 2014/0262478 A1 | 9/2014 | Harris et al. |
| 2014/0275854 A1 | 9/2014 | Venkatraman et al. |
| 2014/0280295 A1 | 9/2014 | Kurochikin et al. |
| 2014/0281975 A1 | 9/2014 | Anderson |
| 2014/0282877 A1 | 9/2014 | Mahaffey et al. |
| 2014/0297006 A1 | 10/2014 | Sadhu |
| 2014/0298266 A1 | 10/2014 | Lapp |
| 2014/0300506 A1 | 10/2014 | Alton et al. |
| 2014/0306936 A1 | 10/2014 | Dahl et al. |
| 2014/0309855 A1 | 10/2014 | Tran |
| 2014/0316261 A1 | 10/2014 | Lux et al. |
| 2014/0318699 A1 | 10/2014 | Longinotti-Buitoni et al. |
| 2014/0324888 A1 | 10/2014 | Xie et al. |
| 2014/0329567 A1 | 11/2014 | Chan et al. |
| 2014/0333467 A1 | 11/2014 | Inomata |
| 2014/0343392 A1 | 11/2014 | Yang |
| 2014/0347295 A1 | 11/2014 | Kim et al. |
| 2014/0357369 A1 | 12/2014 | Callens et al. |
| 2014/0368378 A1 | 12/2014 | Crain et al. |
| 2014/0368441 A1 | 12/2014 | Touloumtzis |
| 2014/0376788 A1 | 12/2014 | Xu et al. |
| 2015/0002391 A1 | 1/2015 | Chen |
| 2015/0009096 A1 | 1/2015 | Lee et al. |
| 2015/0026815 A1 | 1/2015 | Barrett |
| 2015/0029050 A1 | 1/2015 | Driscoll et al. |
| 2015/0030256 A1 | 1/2015 | Brady et al. |
| 2015/0040040 A1 | 2/2015 | Balan et al. |
| 2015/0046183 A1 | 2/2015 | Cireddu |
| 2015/0062033 A1 | 3/2015 | Ishihara |
| 2015/0068069 A1 | 3/2015 | Tran et al. |
| 2015/0077282 A1 | 3/2015 | Mohamadi |
| 2015/0085060 A1 | 3/2015 | Fish et al. |
| 2015/0091820 A1 | 4/2015 | Rosenberg et al. |
| 2015/0091858 A1 | 4/2015 | Rosenberg et al. |
| 2015/0091859 A1 | 4/2015 | Rosenberg et al. |
| 2015/0091903 A1 | 4/2015 | Costello et al. |
| 2015/0095987 A1 | 4/2015 | Potash et al. |
| 2015/0099941 A1 | 4/2015 | Tran |
| 2015/0100328 A1 | 4/2015 | Kress et al. |

(56) References Cited

U.S. PATENT DOCUMENTS

| | | |
|---|---|---|
| 2015/0106770 A1 | 4/2015 | Shah et al. |
| 2015/0109164 A1 | 4/2015 | Takaki |
| 2015/0112606 A1 | 4/2015 | He et al. |
| 2015/0133017 A1 | 5/2015 | Liao et al. |
| 2015/0143601 A1 | 5/2015 | Longinotti-Buitoni et al. |
| 2015/0145805 A1 | 5/2015 | Liu |
| 2015/0162729 A1 | 6/2015 | Reversat et al. |
| 2015/0177866 A1 | 6/2015 | Wang et al. |
| 2015/0185314 A1 | 7/2015 | Corcos et al. |
| 2015/0199045 A1 | 7/2015 | Robucci et al. |
| 2015/0205358 A1 | 7/2015 | Lyren |
| 2015/0223733 A1 | 8/2015 | Al-Alusi |
| 2015/0226004 A1 | 8/2015 | Thompson |
| 2015/0229885 A1 | 8/2015 | Offenhaeuser |
| 2015/0256763 A1 | 9/2015 | Niemi |
| 2015/0261320 A1 | 9/2015 | Leto |
| 2015/0268027 A1 | 9/2015 | Gerdes |
| 2015/0268799 A1 | 9/2015 | Starner et al. |
| 2015/0277569 A1 | 10/2015 | Sprenger et al. |
| 2015/0280102 A1 | 10/2015 | Tajitsu et al. |
| 2015/0285906 A1 | 10/2015 | Hooper et al. |
| 2015/0287187 A1 | 10/2015 | Redtel |
| 2015/0301167 A1 | 10/2015 | Sentelle et al. |
| 2015/0312041 A1 | 10/2015 | Choi |
| 2015/0314780 A1 | 11/2015 | Stenneth et al. |
| 2015/0317518 A1 | 11/2015 | Fujimaki et al. |
| 2015/0323993 A1 | 11/2015 | Levesque et al. |
| 2015/0332075 A1 | 11/2015 | Burch |
| 2015/0341550 A1 | 11/2015 | Lay |
| 2015/0346820 A1 | 12/2015 | Poupyrev et al. |
| 2015/0350902 A1 | 12/2015 | Baxley et al. |
| 2015/0351703 A1 | 12/2015 | Phillips et al. |
| 2015/0375339 A1 | 12/2015 | Sterling et al. |
| 2016/0018948 A1 | 1/2016 | Parvarandeh et al. |
| 2016/0026253 A1 | 1/2016 | Bradski et al. |
| 2016/0038083 A1 | 2/2016 | Ding et al. |
| 2016/0041617 A1 | 2/2016 | Poupyrev |
| 2016/0041618 A1 | 2/2016 | Poupyrev |
| 2016/0042169 A1 | 2/2016 | Polehn |
| 2016/0048235 A1 | 2/2016 | Poupyrev |
| 2016/0048236 A1 | 2/2016 | Poupyrev |
| 2016/0048672 A1 | 2/2016 | Lux et al. |
| 2016/0054792 A1 | 2/2016 | Poupyrev |
| 2016/0054803 A1 | 2/2016 | Poupyrev |
| 2016/0054804 A1 | 2/2016 | Gollakata et al. |
| 2016/0055201 A1 | 2/2016 | Poupyrev et al. |
| 2016/0090839 A1 | 3/2016 | Stolarcyzk |
| 2016/0098089 A1 | 4/2016 | Poupyrev |
| 2016/0100166 A1 | 4/2016 | Dragne et al. |
| 2016/0103500 A1 | 4/2016 | Hussey et al. |
| 2016/0106328 A1 | 4/2016 | Mestha et al. |
| 2016/0131741 A1 | 5/2016 | Park |
| 2016/0140872 A1 | 5/2016 | Palmer et al. |
| 2016/0145776 A1 | 5/2016 | Roh |
| 2016/0146931 A1 | 5/2016 | Rao et al. |
| 2016/0170491 A1 | 6/2016 | Jung |
| 2016/0171293 A1 | 6/2016 | Li et al. |
| 2016/0186366 A1 | 6/2016 | McMaster |
| 2016/0206244 A1 | 7/2016 | Rogers |
| 2016/0213331 A1 | 7/2016 | Gil et al. |
| 2016/0216825 A1 | 7/2016 | Forutanpour |
| 2016/0220152 A1 | 8/2016 | Meriheina et al. |
| 2016/0249698 A1 | 9/2016 | Berzowska et al. |
| 2016/0252607 A1 | 9/2016 | Saboo et al. |
| 2016/0252965 A1 | 9/2016 | Mandella et al. |
| 2016/0253044 A1 | 9/2016 | Katz |
| 2016/0259037 A1 | 9/2016 | Molchanov et al. |
| 2016/0262685 A1 | 9/2016 | Wagner et al. |
| 2016/0282988 A1 | 9/2016 | Poupyrev |
| 2016/0283101 A1 | 9/2016 | Schwesig et al. |
| 2016/0284436 A1 | 9/2016 | Fukuhara et al. |
| 2016/0287172 A1 | 10/2016 | Morris et al. |
| 2016/0299526 A1 | 10/2016 | Inagaki et al. |
| 2016/0320852 A1 | 11/2016 | Poupyrev |
| 2016/0320853 A1 | 11/2016 | Lien et al. |
| 2016/0320854 A1 | 11/2016 | Lien et al. |
| 2016/0321428 A1 | 11/2016 | Rogers |
| 2016/0338599 A1 | 11/2016 | DeBusschere et al. |
| 2016/0345638 A1 | 12/2016 | Robinson et al. |
| 2016/0349790 A1 | 12/2016 | Connor |
| 2016/0349845 A1 | 12/2016 | Poupyrev et al. |
| 2016/0377712 A1 | 12/2016 | Wu et al. |
| 2017/0029985 A1 | 2/2017 | Tajitsu et al. |
| 2017/0052618 A1 | 2/2017 | Lee et al. |
| 2017/0060254 A1 | 3/2017 | Molchanov et al. |
| 2017/0060298 A1 | 3/2017 | Hwang et al. |
| 2017/0075481 A1 | 3/2017 | Chou et al. |
| 2017/0075496 A1 | 3/2017 | Rosenberg et al. |
| 2017/0097413 A1 | 4/2017 | Gillian et al. |
| 2017/0097684 A1 | 4/2017 | Lien |
| 2017/0115777 A1 | 4/2017 | Poupyrev |
| 2017/0124407 A1 | 5/2017 | Micks et al. |
| 2017/0125940 A1 | 5/2017 | Karagozler et al. |
| 2017/0192629 A1 | 7/2017 | Takada et al. |
| 2017/0196513 A1 | 7/2017 | Longinotti-Buitoni et al. |
| 2017/0232538 A1 | 8/2017 | Robinson et al. |
| 2017/0233903 A1 | 8/2017 | Jeon |
| 2017/0249033 A1 | 8/2017 | Podhajny et al. |
| 2017/0322633 A1 | 11/2017 | Shen et al. |
| 2017/0325337 A1 | 11/2017 | Karagozler et al. |
| 2017/0325518 A1 | 11/2017 | Poupyrev et al. |
| 2017/0329412 A1 | 11/2017 | Schwesig et al. |
| 2017/0329425 A1 | 11/2017 | Karagozler et al. |
| 2018/0000354 A1 | 1/2018 | DeBusschere et al. |
| 2018/0000355 A1 | 1/2018 | DeBusschere et al. |
| 2018/0004301 A1 | 1/2018 | Poupyrev |
| 2018/0005766 A1 | 1/2018 | Fairbanks et al. |
| 2018/0046258 A1 | 2/2018 | Poupyrev |
| 2018/0095541 A1 | 4/2018 | Gribetz et al. |
| 2018/0106897 A1 | 4/2018 | Shouldice et al. |
| 2018/0113032 A1 | 4/2018 | Dickey et al. |
| 2018/0157330 A1 | 6/2018 | Gu et al. |
| 2018/0160943 A1 | 6/2018 | Fyfe et al. |
| 2018/0177464 A1 | 6/2018 | DeBusschere et al. |
| 2018/0196527 A1 | 7/2018 | Poupyrev et al. |
| 2018/0256106 A1 | 9/2018 | Rogers et al. |
| 2018/0296163 A1 | 10/2018 | DeBusschere et al. |
| 2018/0321841 A1 | 11/2018 | Lapp |
| 2019/0033981 A1 | 1/2019 | Poupyrev |
| 2019/0138109 A1 | 5/2019 | Poupyrev et al. |
| 2019/0155396 A1 | 5/2019 | Lien et al. |

FOREIGN PATENT DOCUMENTS

| | | |
|---|---|---|
| CN | 102414641 | 4/2012 |
| CN | 102782612 | 11/2012 |
| CN | 102893327 | 1/2013 |
| CN | 202887794 | 4/2013 |
| CN | 103076911 | 5/2013 |
| CN | 103502911 | 1/2014 |
| CN | 102660988 | 3/2014 |
| CN | 104035552 | 9/2014 |
| CN | 103355860 | 1/2016 |
| DE | 102011075725 | 11/2012 |
| DE | 102013201359 | 7/2014 |
| EP | 0161895 | 11/1985 |
| EP | 1785744 | 5/2007 |
| EP | 1815788 | 8/2007 |
| EP | 2417908 | 2/2012 |
| EP | 2637081 | 9/2013 |
| EP | 2770408 | 8/2014 |
| EP | 2953007 | 12/2015 |
| EP | 3201726 | 8/2017 |
| FR | 3017722 | 8/2015 |
| GB | 2070469 | 9/1981 |
| GB | 2443208 | 4/2008 |
| JP | 113860 | 4/1999 |
| JP | 11168268 | 6/1999 |
| JP | 2003280049 | 10/2003 |
| JP | 2006234716 | 9/2006 |
| JP | 2007011873 | 1/2007 |
| JP | 2007132768 | 5/2007 |
| JP | 2008287714 | 11/2008 |
| JP | 2009037434 | 2/2009 |

(56) References Cited

FOREIGN PATENT DOCUMENTS

| | | |
|---|---|---|
| JP | 2011102457 | 5/2011 |
| JP | 201218583 | 9/2012 |
| JP | 2012198916 | 10/2012 |
| JP | 2013196047 | 9/2013 |
| JP | 2014532332 | 12/2014 |
| KR | 1020080102516 | 11/2008 |
| KR | 100987650 | 10/2010 |
| KR | 1020140055985 | 5/2014 |
| KR | 101914850 | 10/2018 |
| TW | 201425974 | 7/2014 |
| WO | 9001895 | 3/1990 |
| WO | WO-0130123 | 4/2001 |
| WO | WO-2001027855 | 4/2001 |
| WO | WO-0175778 | 10/2001 |
| WO | WO-2002082999 | 10/2002 |
| WO | 2004004557 | 1/2004 |
| WO | WO-2005033387 | 4/2005 |
| WO | 2007125298 | 11/2007 |
| WO | WO-2008061385 | 5/2008 |
| WO | WO-2009032073 | 3/2009 |
| WO | 2009083467 | 7/2009 |
| WO | WO-2010032173 | 3/2010 |
| WO | 2010101697 | 9/2010 |
| WO | WO-2012026013 | 3/2012 |
| WO | 2012064847 | 5/2012 |
| WO | WO-2012152476 | 11/2012 |
| WO | WO-2013082806 | 6/2013 |
| WO | WO-2013084108 | 6/2013 |
| WO | 2013192166 | 12/2013 |
| WO | WO-2013186696 | 12/2013 |
| WO | WO-2013191657 | 12/2013 |
| WO | WO-2014019085 | 2/2014 |
| WO | 2014085369 | 6/2014 |
| WO | WO-2014116968 | 7/2014 |
| WO | 2014124520 | 8/2014 |
| WO | WO-2014136027 | 9/2014 |
| WO | WO-2014138280 | 9/2014 |
| WO | WO-2014160893 | 10/2014 |
| WO | WO-2014165476 | 10/2014 |
| WO | WO-2014204323 | 12/2014 |
| WO | WO-2015017931 | 2/2015 |
| WO | WO-2015022671 | 2/2015 |
| WO | 2016053624 | 4/2016 |
| WO | 2016118534 | 7/2016 |
| WO | 2016176471 | 11/2016 |
| WO | 2016178797 | 11/2016 |
| WO | 2017019299 | 2/2017 |
| WO | 2017062566 | 4/2017 |
| WO | 2017200571 | 11/2017 |
| WO | 20170200949 | 11/2017 |
| WO | 2018106306 | 6/2018 |

OTHER PUBLICATIONS

"Final Office Action", U.S. Appl. No. 15/398,147, dated Jun. 30, 2017, 11 pages.
"Final Office Action", U.S. Appl. No. 14/874,955, dated Jun. 30, 2017, 9 pages.
"Final Office Action", U.S. Appl. No. 14/959,799, dated Jul. 19, 2017, 12 pages.
"Final Office Action", U.S. Appl. No. 14/504,121, dated Aug. 8, 2017, 16 pages.
"International Search Report and Written Opinion", Application No. PCT/US2016/063874, dated May 11, 2017, 19 pages.
"Non-Final Office Action", U.S. Appl. No. 14/862,409, dated Jun. 22, 2017, 15 pages.
"Non-Final Office Action", U.S. Appl. No. 14/959,730, dated Jun. 23, 2017, 14 pages.
"Notice of Allowance", U.S. Appl. No. 14/513,875, dated Jun. 28, 2017, 7 pages.
"Notice of Allowance", U.S. Appl. No. 15/343,067, dated Jul. 27, 2017, 9 pages.
"Notice of Allowance", U.S. Appl. No. 14/504,038, dated Aug. 7, 2017, 17 pages.
"Cardiio", Retrieved from: <http://www.cardiio.com/> Apr. 15, 2015 App Information Retrieved From: <https://itunes.apple.com/us/app/cardiio-touchless-camera-pulse/id542891434?Is=1&mt=8> Apr. 15, 2015, Feb. 24, 2015, 6 pages.
"Extended European Search Report", EP Application No. 15170577.9, dated Nov. 5, 2015, 12 pages.
"Final Office Action", U.S. Appl. No. 14/312,486, dated Jun. 3, 2016, 32 pages.
"Final Office Action", U.S. Appl. No. 14/504,038, dated Sep. 27, 2016, 23 pages.
"Final Office Action", U.S. Appl. No. 14/504,061, dated Mar. 9, 2016, 10 pages.
"Frogpad Introduces Wearable Fabric Keyboard with Bluetooth Technology", Retrieved From: <http://www.geekzone.co.nz/content.asp?contentid=3898> Mar. 16, 2015, Jan. 7, 2005, 2 pages.
"International Search Report and Written Opinion", Application No. PCT/US2015/044774, dated Nov. 3, 2015, 12 pages.
"International Search Report and Written Opinion", Application No. PCT/US2016/024267, dated Jun. 20, 2016, 13 pages.
"International Search Report and Written Opinion", Application No. PCT/US2016/024273, dated Jun. 20, 2016, 13 pages.
"International Search Report and Written Opinion", Application No. PCT/US2016/032307, dated Aug. 25, 2016, 13 pages.
"International Search Report and Written Opinion", Application No. PCT/US2016/029820, dated Jul. 15, 2016, 14 pages.
"International Search Report and Written Opinion", Application No. PCT/US2016/030177, dated Aug. 2, 2016, 15 pages.
"International Search Report and Written Opinion", Application No. PCT/US2015/043963, dated Nov. 24, 2015, 16 pages.
"International Search Report and Written Opinion", Application No. PCT/US2015/050903, dated Feb. 19, 2016, 18 pages.
"International Search Report and Written Opinion", Application No. PCT/US2016/030115, dated Aug. 8, 2016, 18 pages.
"International Search Report and Written Opinion", Application No. PCT/US2015/043949, dated Dec. 1, 2015, 18 pages.
"Non-Final Office Action", U.S. Appl. No. 14/312,486, dated Oct. 23, 2015, 25 pages.
"Non-Final Office Action", U.S. Appl. No. 14/504,038, dated Feb. 26, 2016, 22 pages.
"Non-Final Office Action", U.S. Appl. No. 14/504,061, dated Nov. 4, 2015, 8 pages.
"Non-Final Office Action", U.S. Appl. No. 14/582,896, dated Jun. 29, 2016, 9 pages.
"Non-Final Office Action", U.S. Appl. No. 14/666,155, dated Aug. 24, 2016, 9 pages.
"Non-Final Office Action", U.S. Appl. No. 14/681,625, dated Aug. 12, 2016, 9 pages.
"Non-Final Office Action", U.S. Appl. No. 14/930,220, dated Sep. 14, 2016, 15 pages.
"Notice of Allowance", U.S. Appl. No. 14/504,061, dated Sep. 12, 2016, 7 pages.
"Philips Vital Signs Camera", Retrieved From: <http://www.vitalsignscamera.com/> Apr. 15, 2015, Jul. 17, 2013, 2 pages.
"Restriction Requirement", U.S. Appl. No. 14/666,155, dated Jul. 22, 2016, 5 pages.
"The Instant Blood Pressure app estimates blood pressure with your smartphone and our algorithm", Retrieved at: http://www.instantbloodpressure.com/—on Jun. 23, 2016, 6 pages.
Arbabian,"A 94GHz mm-Wave to Baseband Pulsed-Radar for Imaging and Gesture Recognition", 2012 IEEE, 2012 Symposium on VLSI Circuits Digest of Technical Papers, 2012, 2 pages.
Balakrishnan,"Detecting Pulse from Head Motions in Video", In Proceedings: CVPR '13 Proceedings of the 2013 IEEE Conference on Computer Vision and Pattern Recognition Available at: <http://people.csail.mit.edu/mrub/vidmag/papers/Balakrishnan_Detecting_Pulse_from_2013_CVPR_paper.pdf>, Jun. 23, 2013, 8 pages.
Couderc,"Detection of Atrial Fibrillation using Contactless Facial Video Monitoring", In Proceedings: Heart Rhythm Society, vol. 12, Issue 1 Available at: <http://www.heartrhythmjournal.com/article/S1547-5271(14)00924-2/pdf>, Jan. 2015, 7 pages.

(56) References Cited

OTHER PUBLICATIONS

Espina,"Wireless Body Sensor Network for Continuous Cuff-less Blood Pressure Monitoring", International Summer School on Medical Devices and Biosensors, 2006, Sep. 2006, 5 pages.

Godana,"Human Movement Characterization in Indoor Environment using GNU Radio Based Radar", Retrieved at: http://repository.tudelft.nl/islandora/object/uuid:414e1868-dd00-4113-9989-4c213f1f7094?collection=education, Nov. 30, 2009, 100 pages.

He,"A Continuous, Wearable, and Wireless Heart Monitor Using Head Ballistocardiogram (BCG) and Head Electrocardiogram (ECG) with a Nanowatt ECG Heartbeat Detection Circuit", In Proceedings: Thesis, Department of Electrical Engineering and Computer Science, Massachusetts Institute of Technology Available at: <http://dspace.mit.edu/handle/1721.1/79221>, Feb. 2013, 137 pages.

Holleis,"Evaluating Capacitive Touch Input on Clothes", Proceedings of the 10th International Conference on Human Computer Interaction, Jan. 1, 2008, 10 pages.

Nakajima,"Development of Real-Time Image Sequence Analysis for Evaluating Posture Change and Respiratory Rate of a Subject in Bed", In Proceedings: Physiological Measurement, vol. 22, No. 3 Retrieved From: <http://iopscience.iop.org/0967-3334/22/3/401/pdf/0967-3334_22_3_401.pdf> Feb. 27, 2015, Aug. 2001, 8 pages.

Patel,"Applications of Electrically Conductive Yarns in Technical Textiles", International Conference on Power System Technology (POWECON), Oct. 30, 2012, 6 pages.

Poh,"A Medical Mirror for Non-Contact Health Monitoring", In Proceedings: ACM SIGGRAPH Emerging Technologies Available at: <http://affect.media.mit.edu/pdfs/11.Poh-etal-SIGGRAPH.pdf>, 2011, 1 page.

Poh,"Non-contact, Automated Cardiac Pulse Measurements Using Video Imaging and Blind Source Separation.", In Proceedings: Optics Express, vol. 18, No. 10.

Available at: <http://www.opticsinfobase.org/view_article.cfm?gotourl=http%3A%2F%2Fwww%2Eopticsinfobase%2Eorg%2FDirectPDFAccess%2F77B04D55%2DBC95%2D6937%2D5BAC49A426378C02%5F199381%2Foe%2D18%D10%2D10762%2Ep, May 7, 2010, 13 pages.

Pu,"Whole-Home Gesture Recognition Using Wireless Signals", MobiCom '13.Proceedings of the 19th annual international conference on Mobile computing &.networking, Aug. 27, 2013, 12 pages.

Wang,"Exploiting Spatial Redundancy of Image Sensor for Motion Robust rPPG", In Proceedings: IEEE Transactions on Biomedical Engineering, vol. 62, Issue 2, Jan. 19, 2015, 11 pages.

Wang,"Micro-Doppler Signatures for Intelligent Human Gait Recognition Using a UWB Impulse Radar", 2011 IEEE International Symposium on Antennas and Propagation (APSURSI), Jul. 3, 2011, pp. 2103-2106.

Wijesiriwardana,"Capacitive Fibre-Meshed Transducer for Touch & Proximity Sensing Applications", IEEE Sensors Journal, IEEE Service Center, Oct. 1, 2005, 5 pages.

Zhadobov,"Millimeter-wave Interactions with the Human Body: State of Knowledge and Recent Advances", International Journal of Microwave and Wireless Technologies, Mar. 1, 2011, 11 pages.

Zhang,"Study of the Structural Design and Capacitance Characteristics of Fabric Sensor", Advanced Materials Research (vols. 194-196), Feb. 21, 2011, 8 pages.

"Corrected Notice of Allowance", U.S. Appl. No. 14/312,486, dated Oct. 28, 2016, 4 pages.

"International Search Report and Written Opinion", Application No. PCT/US2016/024289, dated Aug. 25, 2016, 17 pages.

"Non-Final Office Action", U.S. Appl. No. 14/518,863, dated Oct. 14, 2016, 16 pages.

"Notice of Allowance", U.S. Appl. No. 14/312,486, dated Oct. 7, 2016, 15 pages.

"Notice of Allowance", U.S. Appl. No. 14/582,896, dated Nov. 7, 2016, 5 pages.

"Pre-Interview Communication", U.S. Appl. No. 14/513,875, dated Oct. 21, 2016, 3 pages.

Cheng,"Smart Textiles: From Niche to Mainstream", IEEE Pervasive Computing, Jul. 2013, pp. 81-84.

Farringdon,"Wearable Sensor Badge & Sensor Jacket for Context Awareness", Third International Symposium on Wearable Computers, Oct. 1999, 7 pages.

Pu,"Gesture Recognition Using Wireless Signals", Oct. 2014, pp. 15-18.

Schneegass,"Towards a Garment OS: Supporting Application Development for Smart Garments", Wearable Computers, ACM, Sep. 2014, 6 pages.

"Final Office Action", U.S. Appl. No. 14/959,799, dated Jan. 4, 2018, 17 pages.

"Final Office Action", U.S. Appl. No. 14/959,730, dated Nov. 22, 2017, 16 pages.

"International Search Report and Written Opinion", PCT/US2017/047691, dated Nov. 16, 2017, 13.

"International Search Report and Written Opinion", PCT Application No. PCT/US2017/051663, dated Nov. 29, 2017, 16 pages.

"Non-Final Office Action", U.S. Appl. No. 14/504,121, dated Jan. 2, 2018, 19 pages.

"Non-Final Office Action", U.S. Appl. No. 14/959,901, dated Jan. 8, 2018, 21 pages.

"Non-Final Office Action", U.S. Appl. No. 14/504,139, dated Oct. 18, 2017, 12 pages.

"Non-Final Office Action", U.S. Appl. No. 15/595,649, dated Oct. 31, 2017, 16 pages.

"Non-Final Office Action", U.S. Appl. No. 14/862,409, dated Dec. 14, 2017, 17 pages.

"Notice of Allowance", U.S. Appl. No. 15/403,066, dated Jan. 8, 2018, 18 pages.

"Notice of Allowance", U.S. Appl. No. 14/874,955, dated Oct. 20, 2017, 7 pages.

"Notice of Allowance", U.S. Appl. No. 15/398,147, dated Nov. 15, 2017, 8 pages.

"Notice of Publication", U.S. Appl. No. 15/703,511, dated Jan. 4, 2018, 1 page.

"Restriction Requirement", U.S. Appl. No. 15/362,359, dated Jan. 8, 2018, 5 pages.

Bondade, et al., "A linear-assisted DC-DC hybrid power converter for envelope tracking RF power amplifiers", 2014 IEEE Energy Conversion Congress and Exposition (ECCE), IEEE, Sep. 14, 2014, pp. 5769-5773, XP032680873, DOI: 10.1109/ECCE.2014.6954193, Sep. 14, 2014, 5 pages.

Fan, et al., "Wireless Hand Gesture Recognition Based on Continuous-Wave Doppler Radar Sensors", IEEE Transactions on Microwave Theory and Techniques, Plenum, USA, vol. 64, No. 11, Nov. 1, 2016 (Nov. 1, 2016), pp. 4012-4012, XP011633246, ISSN: 0018-9480, DOI: 10.1109/TMTT.2016.2610427, Nov. 1, 2016, 9 pages.

Lien, et al., "Soli: Ubiquitous Gesture Sensing with Millimeter Wave Radar", ACM Transactions on Graphics (TOG), ACM, US, vol. 35, No. 4, Jul. 11, 2016 (Jul. 11, 2016), pp. 1-19, XP058275791, ISSN: 0730-0301, DOI: 10.1145/2897824.2925953, Jul. 11, 2016, 19 pages.

Martinez-Garcia, et al., "Four-quadrant linear-assisted DC/DC voltage regulator", Analog Integrated Circuits and Signal Processing, Springer New York LLC, US, vol. 88, No. 1, Apr. 23, 2016 (Apr. 23, 2016), pp. 151-160, XP035898949, ISSN: 0925-1030, DOI: 10.1007/S10470-016-0747-8, Apr. 23, 2016, 10 pages.

Skolnik, "CW and Frequency-Modulated Radar", In: "Introduction to Radar Systems", Jan. 1, 1981 (Jan. 1, 1981), McGraw Hill, XP055047545, ISBN: 978-0-07-057909-5 pp. 68-100, p. 95-97, Jan. 1, 1981, 18 pages.

Zheng, et al., "Doppler Bio-Signal Detection Based Time-Domain Hand Gesture Recognition", 2013 IEEE MTT-S International Microwave Workshop Series on RF and Wireless Technologies for Biomedical and Healthcare Applications (IMWS-BIO), IEEE, Dec. 9, 2013 (Dec. 9, 2013), p. 3, XP032574214, DOI: 10.1109/IMWS-BIO.2013.6756200, Dec. 9, 2013, 3 Pages.

"Advisory Action", U.S. Appl. No. 14/504,139, dated Aug. 28, 2017, 3 pages.

"Final Office Action", U.S. Appl. No. 14/959,901, dated Aug. 25, 2017, 19 pages.

"Final Office Action", U.S. Appl. No. 15/403,066, dated Oct. 5, 2017, 31 pages.

(56) References Cited

OTHER PUBLICATIONS

"Non-Final Office Action", U.S. Appl. No. 15/093,533, dated Aug. 24, 2017, 18 pages.
"Non-Final Office Action", U.S. Appl. No. 15/142,619, dated Aug. 25, 2017, 16 pages.
"Non-Final Office Action", U.S. Appl. No. 14/959,799, dated Sep. 8, 2017, 16 pages.
"Non-Final Office Action", U.S. Appl. No. 15/398,147, dated Sep. 8, 2017, 7 pages.
"Non-Final Office Action", U.S. Appl. No. 14/518,863, dated Sep. 29, 2017, 20 pages.
"Non-Final Office Action", U.S. Appl. No. 15/142,689, dated Oct. 4, 2017, 18 pages.
"Pre-Interview Office Action", U.S. Appl. No. 14/862,409, dated Sep. 15, 2017, 16 pages.
"Written Opinion", PCT Application No. PCT/US2016/055671, dated Apr. 13, 2017, 8 pages.
"Written Opinion", PCT Application No. PCT/US2017/032733, dated Jul. 26, 2017, 5 pages.
"Combined Search and Examination Report", GB Application No. 1620892.8, dated Apr. 6, 2017, 5 pages.
"Corrected Notice of Allowance", U.S. Appl. No. 14/930,220, dated Mar. 20, 2017, 2 pages.
"Corrected Notice of Allowance", U.S. Appl. No. 14/930,220, dated May 11, 2017, 2 pages.
"Final Office Action", U.S. Appl. No. 14/518,863, dated May 5, 2017, 18 pages.
"First Action Interview Office Action", U.S. Appl. No. 14/959,901, dated Apr. 14, 2017, 3 pages.
"International Preliminary Report on Patentability", Application No. PCT/US2015/050903, dated Apr. 13, 2017, 12 pages.
"International Search Report and Written Opinion", Application No. PCT/US2016/060399, dated Jan. 30, 2017, 11 pages.
"Non-Final Office Action", U.S. Appl. No. 14/504,038, dated Mar. 22, 2017, 33 pages.
"Non-Final Office Action", U.S. Appl. No. 15/403,066, dated May 4, 2017, 31 pages.
"Notice of Allowance", U.S. Appl. No. 14/494,863, dated May 30, 2017, 7 pages.
"Pre-Interview Communication", U.S. Appl. No. 15/343,067, dated Apr. 19, 2017, 3 pages.
"Textile Wire Brochure", Retrieved at: http://www.textile-wire.ch/en/home.html, Aug. 7, 2004, 17 pages.
Stoppa,"Wearable Electronics and Smart Textiles: A Critical Review", In Proceedings of Sensors, vol. 14, Issue 7, Jul. 7, 2014, pp. 11957-11992.
"Corrected Notice of Allowance", U.S. Appl. No. 14/582,896, dated Feb. 23, 2017, 2 pages.
"International Preliminary Report on Patentability", Application No. PCT/US2015/043963, dated Feb. 16, 2017, 12 pages.
"International Preliminary Report on Patentability", Application No. PCT/US2015/030388, dated Dec. 15, 2016, 12 pages.
"International Preliminary Report on Patentability", Application No. PCT/US2015/043949, dated Feb. 16, 2017, 13 pages.
"International Preliminary Report on Patentability", Application No. PCT/US2015/044774, dated Mar. 2, 2017, 8 pages.
"International Search Report and Written Opinion", Application No. PCT/US2016/062082, dated Feb. 23, 2017, 12 pages.
"International Search Report and Written Opinion", Application No. PCT/US2016/055671, dated Dec. 1, 2016, 14 pages.
"Non-Final Office Action", U.S. Appl. No. 14/513,875, dated Feb. 21, 2017, 9 pages.
"Non-Final Office Action", U.S. Appl. No. 14/874,955, dated Feb. 27, 2017, 8 pages.
"Non-Final Office Action", U.S. Appl. No. 15/398,147, dated Mar. 9, 2017, 10 pages.
"Pre-Interview Communication", U.S. Appl. No. 14/959,730, dated Feb. 15, 2017, 3 pages.
"Corrected Notice of Allowance", U.S. Appl. No. 14/312,486, dated Jan. 23, 2017, 4 pages.
"Corrected Notice of Allowance", U.S. Appl. No. 14/504,061, dated Dec. 27, 2016, 2 pages.
"Corrected Notice of Allowance", U.S. Appl. No. 14/582,896, dated Feb. 6, 2017, 2 pages.
"Corrected Notice of Allowance", U.S. Appl. No. 14/582,896, dated Dec. 19, 2016, 2 pages.
"Non-Final Office Action", U.S. Appl. No. 14/504,121, dated Jan. 9, 2017, 13 pages.
"Non-Final Office Action", U.S. Appl. No. 14/504,139, dated Jan. 27, 2017, 10 pages.
"Non-Final Office Action", U.S. Appl. No. 14/959,799, dated Jan. 27, 2017, 10 pages.
"Notice of Allowance", U.S. Appl. No. 14/930,220, dated Feb. 2, 2017, 8 pages.
"Pre-Interview Communication", U.S. Appl. No. 14/494,863, dated Jan. 27, 2017, 5 pages.
"Pre-Interview Communication", U.S. Appl. No. 14/959,901, dated Feb. 10, 2017, 3 pages.
"Final Office Action", U.S. Appl. No. 14/518,863, dated Apr. 5, 2018, 21 pages.
"Final Office Action", U.S. Appl. No. 14/504,139, dated May 1, 2018, 14 pages.
"Final Office Action", U.S. Appl. No. 15/595,649, dated May 23, 2018, 13 pages.
"First Action Interview Office Action", U.S. Appl. No. 15/166,198, dated Apr. 25, 2018, 8 pages.
"Foreign Office Action", European Application No. 16784352.3, dated May 16, 2018, 3 pages.
"Non-Final Office Action", U.S. Appl. No. 15/287,253, dated Apr. 5, 2018, 17 pages.
"Pre-Interview Communication", U.S. Appl. No. 15/362,359, dated May 17, 2018, 4 pages.
"Preliminary Report on Patentability", PCT Application No. PCT/US2016/055671, dated Apr. 10, 2018, 9 pages.
"Written Opinion", PCT Application No. PCT/US2017/032733, dated Jul. 24, 2017, 5 pages.
"Final Office Action", U.S. Appl. No. 15/142,619, dated Feb. 8, 2018, 15 pages.
"Final Office Action", U.S. Appl. No. 15/093,533, dated Mar. 21, 2018, 19 pages.
"Foreign Office Action", Chinese Application No. 201721290290.3, dated Mar. 9, 2018, 2 pages.
"Non-Final Office Action", U.S. Appl. No. 15/267,181, dated Feb. 8, 2018, 29 pages.
"Non-Final Office Action", U.S. Appl. No. 14/874,955, dated Feb. 8, 2018, 7 pages.
"Notice of Allowance", U.S. Appl. No. 14/959,730, dated Feb. 22, 2018, 8 pages.
"Pre-Interview Communication", U.S. Appl. No. 15/166,198, dated Mar. 8, 2018, 8 pages.
"Final Office Action", U.S. Appl. No. 15/142,689, dated Jun. 1, 2018, 16 pages.
"Final Office Action", U.S. Appl. No. 14/874,955, dated Jun. 11, 2018, 9 pages.
"Final Office Action", U.S. Appl. No. 14/959,901, dated Jun. 15, 2018, 21 pages.
"Final Office Action", U.S. Appl. No. 15/267,181, dated Jun. 7, 2018, 31 pages.
"Final Office Action", U.S. Appl. No. 14/504,121, dated Jul. 9, 2018, 23 pages.
"Foreign Office Action", Chinese Application No. 201721290290.3, dated Jun. 6, 2018, 3 pages.
"Foreign Office Action", Japanese Application No. 2018-501256, dated Jul. 24, 2018, 11 pages.
"Non-Final Office Action", U.S. Appl. No. 15/586,174, dated Jun. 18, 2018, 7 pages.
"Non-Final Office Action", U.S. Appl. No. 15/286,512, dated Jul. 19, 2018, 15 pages.
"Non-Final Office Action", U.S. Appl. No. 15/142,829, dated Aug. 16, 2018, 15 pages.
"Notice of Allowance", U.S. Appl. No. 15/362,359, dated Aug. 3, 2018, 8 pages.

(56) References Cited

OTHER PUBLICATIONS

"Notice of Allowance", U.S. Appl. No. 14/862,409, dated Jun. 6, 2018, 7 pages.
"Notice of Allowance", U.S. Appl. No. 15/142,619, dated Aug. 13, 2018, 9 pages.
"Pre-Interview Communication", U.S. Appl. No. 15/287,359, dated Jul. 24, 2018, 2 pages.
"Restriction Requirement", U.S. Appl. No. 15/286,537, dated Aug. 27, 2018, 8 pages.
"Apple Watch Used Four Sensors to Detect your Pulse", retrieved from http://www.theverge.com/2014/9/9/6126991/apple-watch-four-back-sensors-detect-activity on Sep. 23, 2017 as cited in PCT search report for PCT Application No. PCT/US2016/026756 dated Nov. 10, 2017; The Verge, paragraph 1, Sep. 9, 2014, 4 pages.
"Clever Toilet Checks on Your Health", CNN.Com; Technology, Jun. 28, 2005, 2 pages.
"Final Office Action", U.S. Appl. No. 14/681,625, dated Dec. 7, 2016, 10 pages.
"Final Office Action", U.S. Appl. No. 14/731,195, dated Oct. 11, 2018, 12 pages.
"Final Office Action", U.S. Appl. No. 14/715,454, dated Sep. 7, 2017, 14 pages.
"Final Office Action", U.S. Appl. No. 14/720,632, dated Jan. 9, 2018, 18 pages.
"Final Office Action", U.S. Appl. No. 14/715,454, dated Apr. 17, 2018, 19 pages.
"Final Office Action", U.S. Appl. No. 14/599,954, dated Aug. 10, 2016, 23 pages.
"Final Office Action", U.S. Appl. No. 14/699,181, dated May 4, 2018, 41 pages.
"Final Office Action", U.S. Appl. No. 14/715,793, dated Sep. 12, 2017, 7 pages.
"Final Office Action", U.S. Appl. No. 14/809,901, dated Dec. 13, 2018, 7 pages.
"First Action Interview OA", U.S. Appl. No. 14/715,793, dated Jun. 21, 2017, 3 pages.
"First Action Interview Office Action", U.S. Appl. No. 15/142,471, dated Feb. 5, 2019, 29 pages.
"First Action Interview Office Action", U.S. Appl. No. 14/731,195, dated Jun. 21, 2018, 4 pages.
"First Action Interview Pilot Program Pre-Interview Communication", U.S. Appl. No. 14/731,195, dated Aug. 1, 2017, 3 pages.
"First Examination Report", GB Application No. 1621332.4, dated May 16, 2017, 7 pages.
"Foreign Office Action", Chinese Application No. 201580034536.8, dated Oct. 9, 2018.
"Foreign Office Action", KR Application No. 10-2016-7036023, dated Aug. 11, 2017, 10 pages.
"Foreign Office Action", Chinese Application No. 201580036075.8, dated Jul. 4, 2018, 14 page.
"Foreign Office Action", JP App. No. 2016-567813, dated Jan. 16, 2018, 3 pages.
"Foreign Office Action", Korean Application No. 10-2016-7036015, dated Oct. 15, 2018, 3 pages.
"Foreign Office Action", Japanese Application No. 2016-567839, dated Apr. 3, 2018, 3 pages.
"Foreign Office Action", KR Application No. 10-2016-7035397, dated Sep. 20, 2017, 5 pages.
"Foreign Office Action", Korean Application No. 1020187012629, dated May 24, 2018, 6 pages.
"Foreign Office Action", EP Application No. 15170577.9, dated May 30, 2017, 7 pages.
"Foreign Office Action", Korean Application No. 10-2016-7036396, dated Jan. 3, 2018, 7 pages.
"Foreign Office Action", JP Application No. 2016567813, dated Sep. 22, 2017, 8 pages.
"Foreign Office Action", Japanese Application No. 2018021296, dated Dec. 25, 2018, 8 pages.
"Foreign Office Action", EP Application No. 15754323.2, dated Mar. 9, 2018, 8 pages.
"Foreign Office Action", CN Application No. 201580034908.7, dated Jul. 3, 2018, 12 pages.
"International Preliminary Report on Patentability", PCT Application No. PCT/US2016/026756, dated Oct. 19, 2017, 8 pages.
"International Search Report and Written Opinion", PCT Application No. PCT/US2016/065295, dated Mar. 14, 2017, 12 pages.
"International Search Report and Written Opinion", Application No. PCT/US2016/042013, dated Oct. 26, 2016, 12 pages.
"International Search Report and Written Opinion", Application No. PCT/US2016/034366, dated Nov. 17, 2016, 13 pages.
"International Search Report and Written Opinion", Application No. PCT/US2016/033342, dated Oct. 27, 2016, 20 pages.
"Life:X Lifestyle eXplorer", Retrieved from <https://web.archive.org/web/20150318093841/http://research.microsoft.com/en-us/projects/lifex >, Feb. 3, 2017 , 2 pages.
"Non-Final Office Action", U.S. Appl. No. 15/596,702, dated Jan. 4, 2019, 10 pages.
"Non-Final Office Action", U.S. Appl. No. 14/666,155, dated Feb. 3, 2017 , 12 pages.
"Non-Final Office Action", U.S. Appl. No. 14/809,901, dated May 24, 2018, 13 pages.
"Non-Final Office Action", U.S. Appl. No. 14/720,632, dated Jun. 14, 2017, 16 pages.
"Non-Final Office Action", U.S. Appl. No. 14/715,454, dated Jan. 11, 2018, 16 pages.
"Non-Final Office Action", U.S. Appl. No. 14/599,954, dated Jan. 26, 2017 , 16 pages.
"Non-Final Office Action", U.S. Appl. No. 14/599,954, dated Feb. 2, 2016 , 17 pages.
"Non-Final Office Action", U.S. Appl. No. 14/720,632, dated May 18, 2018, 20 pages.
"Non-Final Office Action", U.S. Appl. No. 14/699,181, dated Oct. 18, 2017, 33 pages.
"Non-Final Office Action", U.S. Appl. No. 14/681,625, dated Mar. 6, 2017 , 7 pages.
"Non-Invasive Quantification of Peripheral Arterial Volume Distensibilitiy and its Non-Lineaer Relationship with Arterial Pressure", Journal of Biomechanics, Pergamon Press, vol. 42, No. 8; as cited in the search report for PCT/US2016/013968 citing the whole document, but in particular the abstract, May 29, 2009, 2 pages.
"Notice of Allowance", U.S. Appl. No. 14/599,954, dated May 24, 2017 , 11 pages.
"Notice of Allowance", U.S. Appl. No. 14/715,793, dated Jul. 6, 2018, 5 pages.
"Notice of Allowance", U.S. Appl. No. 15/286,495, dated Jan. 17, 2019, 5 pages.
"Notice of Allowance", U.S. Appl. No. 15/595,649, dated Jan. 3, 2019, 5 pages.
"Notice of Allowance", U.S. Appl. No. 14/715,793, dated Dec. 18, 2017, 5 pages.
"Notice of Allowance", U.S. Appl. No. 14/666,155, dated Feb. 20, 2018, 5 pages.
"Notice of Allowance", U.S. Appl. No. 14/666,155, dated Jul. 10, 2017, 7 pages.
"Notice of Allowance", U.S. Appl. No. 14/681,625, dated Jun. 7, 2017 , 7 pages.
"Notice of Allowance", U.S. Appl. No. 14/681,625, dated Oct. 23, 2017, 8 pages.
"Notice of Allowance", U.S. Appl. No. 15/142,829, dated Feb. 6, 2019, 8 pages.
"Notice of Allowance", U.S. Appl. No. 14/504,137, dated Feb. 6, 2019, 9 pages.
"Pre-Interview Communication", U.S. Appl. No. 15/142,471, dated Dec. 12, 2018, 3 pages.
"Pre-Interview Communication", U.S. Appl. No. 14/715,793, dated Mar. 20, 2017 , 3 pages.
"Pre-Interview Communication", U.S. Appl. No. 14/715,454, dated Apr. 14, 2017 , 3 pages.
"Pre-Interview Office Action", U.S. Appl. No. 14/731,195, dated Dec. 20, 2017, 4 pages.
"Preliminary Report on Patentability", PCT Application No. PCT/US2016/065295, dated Jul. 24, 2018, 18 pages.

(56) References Cited

OTHER PUBLICATIONS

"Preliminary Report on Patentability", PCT Application No. PCT/US2016/042013, dated Jan. 30, 2018, 7 pages.
"Preliminary Report on Patentability", PCT Application No. PCT/US2016/032307, dated Dec. 7, 2017, 9 pages.
"Pressure-Volume Loop Analysis in Cardiology", retrieved from https://en.wikipedia.org/w/index.php?title=Pressure-volume loop analysis in cardiology&oldid=636928657 on Sep. 23, 2017; Obtained per link provided in search report from PCT/US2016/01398 on Jul. 28, 2016, Dec. 6, 2014, 10 pages.
"Restriction Requirement", U.S. Appl. No. 15/462,957, dated Jan. 4, 2019, 6 pages.
"Restriction Requirement", U.S. Appl. No. 15/352,194, dated Feb. 6, 2019, 8 pages.
"The Dash smart earbuds play back music, and monitor your workout", Retrieved from < http://newatlas.com/bragi-dash-tracking-earbuds/30808/>, Feb. 13, 2014 , 3 pages.
"Thermofocus No Touch Forehead Thermometer", Technimed, Internet Archive. Dec. 24, 2014. https://web.archive.org/web/20141224070848/http://www.tecnimed.it:80/thermofocus-forehead-thermometer-H1N1-swine-flu.html, Dec. 24, 2018, 4 pages.
"Written Opinion", PCT Application No. PCT/US2016/042013, dated Feb. 2, 2017, 6 pages.
"Written Opinion", PCT Application No. PCT/US2016/026756, dated Nov. 10, 2016, 7 pages.
"Written Opinion", PCT Application No. PCT/US2016/065295, dated Apr. 13, 2018, 8 pages.
"Written Opinion", PCT Application PCT/US2016/013968, dated Jul. 28, 2016, 9 pages.
Antonimuthu, "Google's Project Soli brings Gesture Control to Wearables using Radar", YouTube[online], Available from https://www.youtube.com/watch?v=czJfcgvQcNA as accessed on May 9, 2017; See whole video, especially 6:05-6:35.
Duncan, David P. "Motion Compensation of Synthetic Aperture Radar", Microwave Earth Remote Sensing Laboratory, Brigham Young University, Apr. 15, 2003, 5 pages.
Ishijima, Masa "Unobtrusive Approaches to Monitoring Vital Signs at Home", Medical & Biological Engineering and Computing, Springer, Berlin, DE, vol. 45, No. 11 as cited in search report for PCT/US2016/013968 dated Jul. 28, 2016, Sep. 26, 2007, 3 pages.
Klabunde, Richard E. "Ventricular Pressure-Volume Loop Changes in Valve Disease", Retrieved From <https://web.archive.org/web/20101201185256/http://cvphysiology.com/Heart%20Disease/HD009.htm>, Dec. 1, 2010 , 8 pages.
Kubota, Yusuke et al., "A Gesture Recognition Approach by using Microwave Doppler Sensors", IPSJ SIG Technical Report, 2009 (6), Information Processing Society of Japan, Apr. 15, 2010, pp. 1-8, Apr. 15, 2010, 13 pages.
Matthews, Robert J. "Venous Pulse", Retrieved at: http://www.rjmatthewsmd.com/Definitions/venous_pulse.htm—on Nov. 30, 2016, Apr. 13, 2013 , 7 pages.
Otto, Chris et al., "System Architecture of a Wireless Body Area Sensor Network for Ubiquitous Health Monitoring", Journal of Mobile Multimedia; vol. 1, No. 4, Jan. 10, 2006, 20 pages.
Palese, et al., "The Effects of Earphones and Music on the Temperature Measured by Infrared Tympanic Thermometer: Preliminary Results", ORL—head and neck nursing: official journal of the Society of Otorhinolaryngology and Head-Neck Nurses 32.2, Jan. 1, 2013 , pp. 8-12.
Pu, Qifan et al., "Whole-Home Gesture Recognition Using Wireless Signals", MobiCom'13, Sep. 30-Oct. 4, Miami, FL, USA, 2013, 12 pages.
Pu, Qifan et al., "Whole-Home Gesture Recognition Using Wireless Signals", Proceedings of the 19th annual international conference on Mobile computing & networking (MobiCom'13), US, ACM, Sep. 30, 2013, pp. 27-38, Sep. 30, 2013, 12 pages.
Zhadobov, Maxim et al., "Millimeter-Wave Interactions with the Human Body: State of Knowledge and Recent Advances", International Journal of Microwave and Wireless Technologies, p. 1 of 11.; Cambridge University Press and the European Microwave Association, 2011, doi:10.1017/S1759078711000122, 2011.
"Corrected Notice of Allowance", U.S. Appl. No. 15/362,359, dated Sep. 17, 2018, 10 pages.
"Final Office Action", U.S. Appl. No. 15/286,512, dated Dec. 26, 2018, 15 pages.
"Final Office Action", U.S. Appl. No. 15/166,198, dated Sep. 27, 2018, 33 pages.
"International Preliminary Report on Patentability", PCT Application No. PCT/US2017/032733, dated Nov. 29, 2018, 7 pages.
"Non-Final Office Action", U.S. Appl. No. 15/287,253, dated Sep. 7, 2018, 20 pages.
"Non-Final Office Action", U.S. Appl. No. 14/959,901, dated Oct. 11, 2018, 22 pages.
"Non-Final Office Action", U.S. Appl. No. 15/287,308, dated Oct. 15, 2018, 18 pages.
"Non-Final Office Action", U.S. Appl. No. 15/286,837, dated Oct. 26, 2018, 10 pages.
"Non-Final Office Action", U.S. Appl. No. 14/504,139, dated Oct. 5, 2018, 16 pages.
"Non-Final Office Action", U.S. Appl. No. 15/286,537, dated Nov. 19, 2018, 18 pages.
"Non-Final Office Action", U.S. Appl. No. 15/287,155, dated Dec. 10, 2018, 12 pages.
"Notice of Allowance", U.S. Appl. No. 15/142,689, dated Oct. 30, 2018, 9 pages.
"Notice of Allowance", U.S. Appl. No. 14/874,955, dated Oct. 4, 2018, 8 pages.
"Notice of Allowance", U.S. Appl. No. 15/287,200, dated Nov. 6, 2018, 19 pages.
"Notice of Allowance", U.S. Appl. No. 15/595,649, dated Sep. 14, 2018, 8 pages.
"Notice of Allowance", U.S. Appl. No. 15/586,174, dated Sep. 24, 2018, 5 pages.
"Pre-Interview Communication", U.S. Appl. No. 15/286,495, dated Sep. 10, 2018, 4 pages.
"Written Opinion", PCT Application No. PCT/US2017/051663, dated Oct. 12, 2018, 8 pages.
Gürbüz, et al., "Detection and Identification of Human Targets in Radar Data", Proc. SPIE 6567, Signal Processing, Sensor Fusion, and Target Recognition XVI, 656701, May 7, 2007, 12 pages.
"Final Office Action", U.S. Appl. No. 15/287,308, dated Feb. 8, 2019, 23 pages.
"Final Office Action", U.S. Appl. No. 15/287,155, dated Apr. 10, 2019, 11 pages.
"Final Office Action", U.S. Appl. No. 15/286,537, dated Apr. 19, 2019, 21 pages.
"Final Office Action", U.S. Appl. No. 15/287,253, dated Apr. 2, 2019, 10 pages.
"Foreign Office Action", Japanese Application No. 2018501256, dated Feb. 26, 2019, 3 pages.
"Non-Final Office Action", U.S. Appl. No. 15/166,198, dated Feb. 21, 2019, 48 pages.
"Non-Final Office Action", U.S. Appl. No. 15/287,394, dated Mar. 22, 2019, 39 pages.
"Non-Final Office Action", U.S. Appl. No. 16/238,464, dated Mar. 7, 2019, 15 pages.
"Notice of Allowance", U.S. Appl. No. 15/286,837, dated Mar. 6, 2019, 7 pages.
"Notice of Allowance", U.S. Appl. No. 15/703,511, dated Apr. 16, 2019, 5 pages.
"Notice of Allowance", U.S. Appl. No. 15/286,512, dated Apr. 9, 2019, 14 pages.
"Pre-Interview Communication", U.S. Appl. No. 15/917,238, dated May 1, 2019, 6 pages.
"Pre-Interview Communication", U.S. Appl. No. 15/703,511, dated Feb. 11, 2019, 5 pages.
Garmatyuk, et al., "Ultra-Wideband Continuous-Wave Random Noise Arc-SAR", IEEE Transaction on Geoscience and Remote Sensing, vol. 40, No. 12, Dec. 2002, Dec. 2002, 10 pages.
Geisheimer, et al., "A Continuous-Wave (CW) Radar for Gait Analysis", IEEE 2001, 2001, 5 pages.

(56) References Cited

OTHER PUBLICATIONS

"Non-Final Office Action", U.S. Appl. No. 15/424,263, dated May 23, 2019, 12 pages.
"Non-Final Office Action", U.S. Appl. No. 15/462,957, dated May 24, 2019, 14 pages.

* cited by examiner

GESTURE COMPONENT WITH GESTURE LIBRARY

PRIORITY APPLICATION

This application claims priority under 35 U.S.C. § 119(e) to U.S. Provisional Patent Application Ser. No. 62/237,975, titled "Signal Processing and Gesture Recognition", filed on Oct. 6, 2015, the disclosure of which is incorporated by reference herein in its entirety.

BACKGROUND

This background description is provided for the purpose of generally presenting the context of the disclosure. Unless otherwise indicated herein, material described in this section is neither expressly nor impliedly admitted to be prior art to the present disclosure or the appended claims.

Gestures continue to evolve as one of the primary ways in which users interact with an ever increasing variety of types of computing devices. For example, gestures have expanded from detection using a trackpad to touchscreen functionality and even detection of objects and motion in three dimensions. As the ways in which gestures may be detected has expanded, so too has use of these gestures expanded across an ever increasing variety of computing devices, from laptops, to mobile phones, tablets, televisions, game consoles, and other devices as part of the "Internet of Things."

However, this implementation by conventional computing devices lacks consistency in both which gestures are supported as well as which operations of the computing devices are controlled by these gestures. For example, a gesture usable to control volume on a television may differ from a gesture usable to control volume on a game console. Thus, a result of this is that users may have difficulty in determining which operations of a computing device are controlled with which gestures. This is especially problematic due to the very nature of gestures. For example, it may be difficult for a user to determine which gestures are available to control operations by this variety of types of computing devices, as opposed to conventional input devices that use buttons and other hardware to initiate operations that may be readily identified on the button itself.

SUMMARY

This Summary is provided to introduce a selection of concepts in a simplified form that are further described below in the Detailed Description. This Summary is not intended to identify key features or essential features of the claimed subject matter.

A gesture component with a gesture library is described. The gesture component is configured to expose operations for execution by application of a computing device based on detected gestures. In one example, an input is detected using a three dimensional object detection system of a gesture component of the computing device. A gesture is recognized by the gesture component based on the detected input through comparison with a library of gestures maintained by the gesture component. An operation is then recognized that corresponds to the gesture by the gesture component using the library of gestures. The operation is exposed by the gesture component via an application programming interface to at least one application executed by the computing device to control performance of the operation by the at least one application.

BRIEF DESCRIPTION OF THE DRAWINGS

Various aspects of gesture components and gesture libraries are described with reference to the following drawings. The same numbers are used throughout the drawings to reference like features and components.

DETAILED DESCRIPTION

Overview

Figure 1:
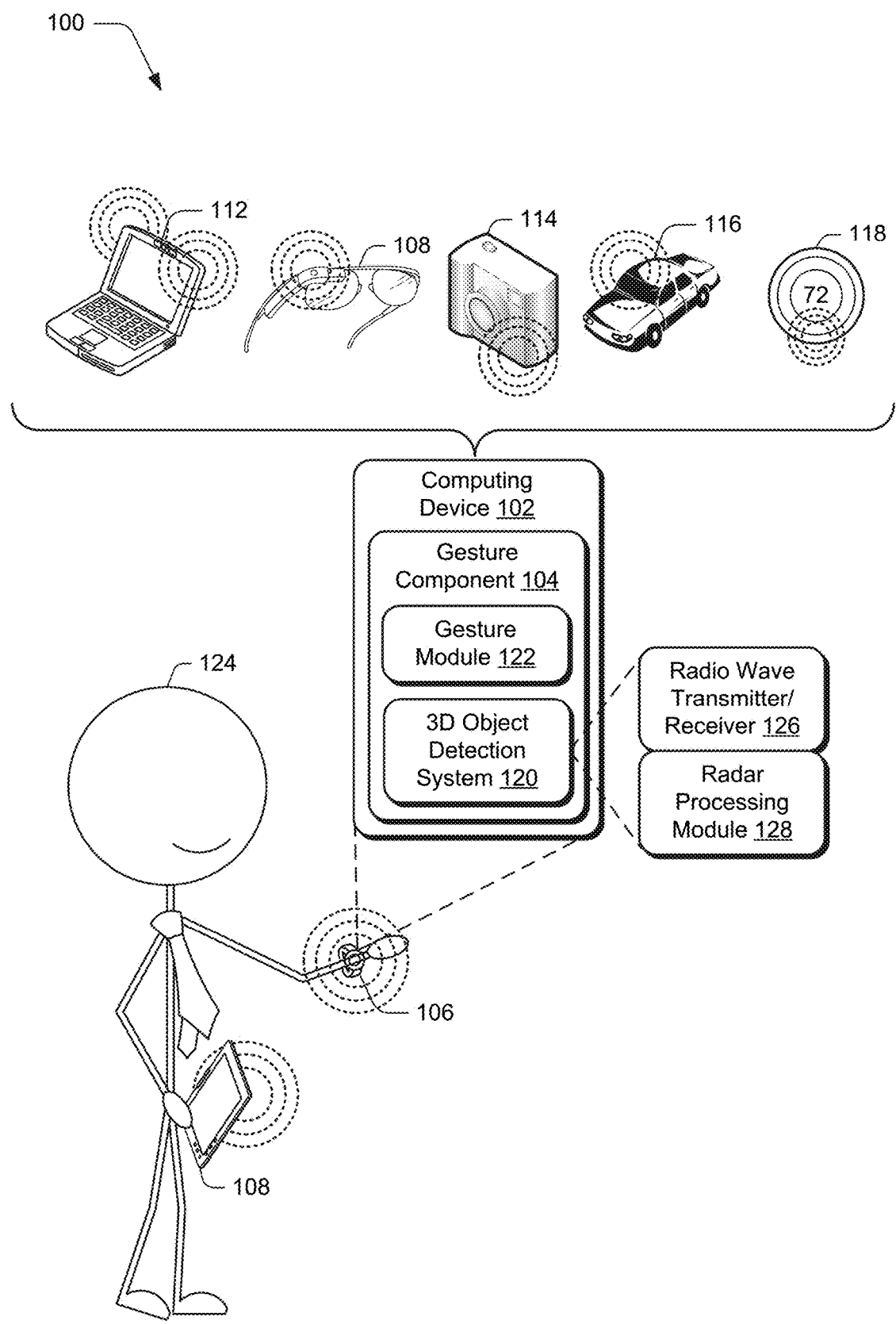
FIG. 1 illustrates an example environment that employs gesture detection in accordance with one or more implementations.

Gestures have become one of the primary techniques with which users interact with an increasing range of types of computing devices. However, conventional use of gestures has become fractured such that different types of computing devices employ different gestures to perform different operations. This may result in user frustration and a complicated user experience with these devices.

Accordingly, gesture component and gesture library techniques are described. These techniques and systems are implemented to provide a consistent and readily understood way for users to interact with computing devices using gestures. To do so, a gesture component incorporates techniques usable to detect gestures, such as a touchpad, touchscreen functionality, cameras, and so on. For instance, a three-dimensional object detection system may be employed in which gestures are detected in free space, without any attachment or peripheral device connected to a corresponding body part, such as a hand. The three-dimensional object detection system, for instance, may leverage transmission and reception of radio signals to detect orientation and movement of an object (e.g., a body part of a user such as a hand) in three-dimensional space.

Inputs resulting from this detection are then processed by leveraging a gesture library of the gesture component. The gesture library, for instance, may define gestures that are detectable and operations that are to be controlled (e.g., initiated) by an application based on those gestures. Accordingly, the inputs may be compared to the gesture library to recognize a gesture and an operation to be performed corresponding to that recognized gesture. The gesture library may also define an amount, to which, the operation is to be performed based on the recognized gesture as further described below.

An operation to be controlled by the gesture as a result of this comparison is then exposed, via one or more application programming interfaces, by the gesture component to an application that is executable by the computing device. The gesture, for instance, may be recognized by the gesture component to increase volume. The gesture component may then expose via the application programming interfaces to an application to increase the volume in rendering of digital content, e.g., audio or multimedia content. Thus, in this example the operation and amount (e.g., degree) to which the operation is to be performed are exposed via the application programming interface.

The application may then cause this operation to be performed at the specified amount without being made aware that a gesture was used to initiate the operation nor how that gesture was performed or detected. In this way, application developers are provided with an efficient technique with which to leverage these gestures without specifically developing the gestures. Further, these gestures may be shared across a plurality of applications, thereby providing a common and intuitive way with which for the user to interact with these applications in an expected and well understood manner.

In one example, media gestures are defined to control media-related operations of an application, such as volume, navigation, zooming, and so forth. In another example, navigation gestures are defined to control navigation-relation operations of an application, such as to pan, zoom, scroll, grab-and-drop, and so forth. Other examples are also contemplated to initiate and control operations that are common to applications. Further discussion of these and other examples are described in the following sections.

In the following discussion, an example environment is first described in which various implementations can be employed. Following this is a discussion of example of use of a gesture library to implement common gestures across a plurality of applications. Radio frequency (RF) signal propagation properties and how these properties can be employed in accordance with one or more implementations are then described that are usable to detect these gestures. Finally, an example device is described in which various embodiments of wireless hand gesture detection can be employed.

Example Environment

FIG. 1 is an illustration of an environment 100 in an example implementation that is operable to employ gesture library and control techniques described herein. The illustrated environment 100 includes a computing device 102, which is configurable in a variety of ways and includes a gesture component 104.

The computing device 102, for instance, may be configured as a wearable device having a housing that is configured to be worn by or attached to a user. As such, the housing of the wearable device 106 may take a variety of different forms, such as a ring, broach, pendant, configured to be worn on a wrist of a user as illustrated, glasses 108 as also illustrated, and so forth. The computing device 102 may also be configured to include a housing configured to be held 110 by one or more hands of a user, such as a mobile phone or tablet as illustrated, a laptop 112 computer, a dedicated camera 114, and so forth. Other examples include incorporation of the computing device 102 as part of a vehicle 116 (e.g., plane, train, boat, aircraft, and balloon), as part of the "Internet-of-things" such as a thermostat 118, appliance, vent, furnace, and so forth. Additional forms of computing devices 102 include desktop computers, game consoles, media consumption devices, televisions, and so on.

Thus, the computing device 102 ranges from full resource devices with substantial memory and processor resources (e.g., personal computers, game consoles) to a low-resource device with limited memory and/or processing resources (e.g., wearables). Although single computing device examples are shown, a computing device may be representative of a plurality of different devices (e.g., a television and remote control) as further described in relation to FIG. 8.

The computing device 102, regardless of configuration, is configured to include a gesture component 104 to detect one or more gestures to control operations of the computing device 102. The gesture component 104 in the illustrated example includes a three dimensional (3D) object detection system 120 and a gesture module 122 that is implemented at least partially in hardware. The gesture component 104 is representative of functionality to identify gestures made by a user 124 (e.g., either directly by the user and/or with an object) to control operations to be performed by the computing device 102. For example, the gesture module 122 may receive inputs from the three dimensional object detection system 120 that are usable to detect attributes to identify an object, orientation of the object, and/or movement of the object. Based on recognition of a combination of one or more of the attributes, the gesture module 122 may cause an operation to be performed, such as to detect a rightward swipe by a user's hand and cause a user interface output by the computing device 102 to move a corresponding direction.

The 3D object detection system 120 is configurable to detect objects in three dimensions, such as to identify the object, an orientation of the object, and/or movement of the object. The detection may be performed using a variety of different techniques, such as cameras (e.g., a time-of-flight camera), sound waves, and so on. In the illustrated example, the 3D object detection system 120 is configured to use radar techniques and radio waves through use of a radio wave transmitter/receiver 126 and a radar processing module 128. The radio wave transmitter/receiver 128, for instance, transmits radio waves in the radio frequency range corresponding to one or more Wi-Fi frequency bands, e.g., IEEE 802.11 and so forth. The radar processing module 128 then detects return of these radio waves to detect objects, which may be performed at a resolution of less than one centimeter as further described beginning in relation to FIG. 4 in the following.

Through use of radio waves, the 3D object detection system 120 may detect objects that are located behind other objects, e.g., are least partially obscured from "view" by another object. The 3D object detection system 120 may also transmit through materials such as fabric and plastics and even through a housing of the computing device 102 itself such that the housing may be made with lower cost and increased protection against outside elements. These techniques may also be leveraged to detect gestures while the computing device 102 is the user's 124 pocket. Complementary detection techniques may also be used, such as for the radar processing module 128 to leverage inputs from a plurality of computing devices, such as a watch and phone as illustrated, to detect as a gesture. In the following, a variety of gesture detection and interaction techniques are described, which may be implemented using radar or other object detection techniques.

Figure 2:
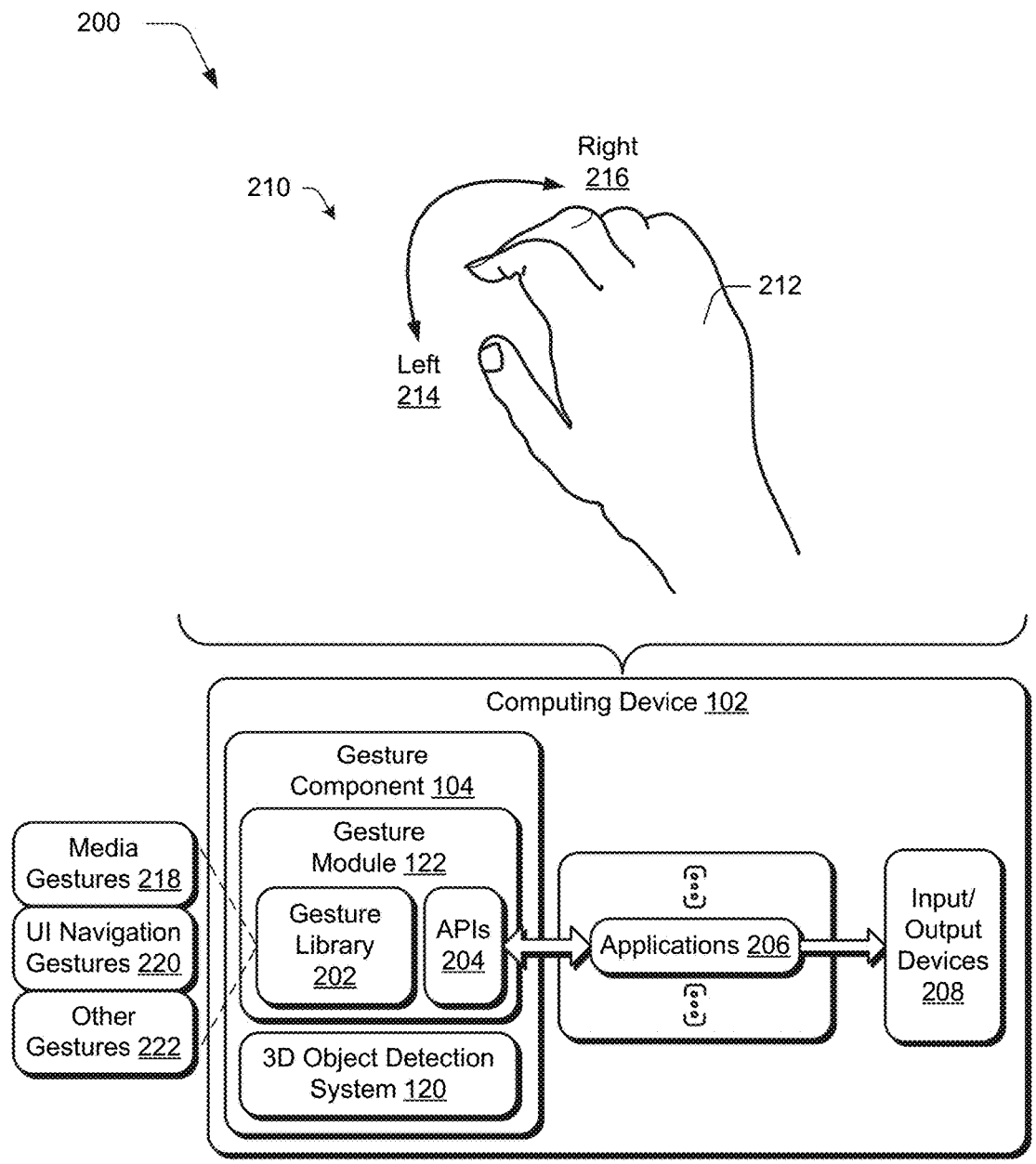
FIG. 2 illustrates an example implementation of a computing device of FIG. 1 in greater detail in accordance with one or more implementations.

FIG. 2 depicts a system 200 in an example implementation in which operation the gesture component 104 is shown in greater detail. In this example, the gestures module 122 employs a gesture library 202. The gesture library 202 is usable by the gesture module 122 to recognize a gesture and an operation to be performed that corresponds to the gesture. The 3D object detection system 120, for instance, may detect an object and movement of the object. Data that results from this detection is then used by the gesture module 122 to identify which of the plurality of gestures in the gesture library 202 correspond to the detected gesture, if any. From this, the gesture module 122 also identifies an operation to be performed that corresponds to the gesture. A result of this is then output by the gesture module 122 via one or more application programming interfaces 204 to applications 206 that are executable by the computing device 102, such as third-party applications, an operating system, and so forth. The applications 206, for instance, may cause operations to be performed that involve input/output device 208, such as to render digital content, transform data, and so forth.

The result output by the gesture module 122 via the APIs 204 to the application 206 may be configured in a variety of ways. In a first such example, the result references the identified gesture, but not how the gesture was detected. In this way, detection of the gesture by the gesture component 104 may be abstracted away from the applications 206 such that the applications 206 are not aware of how the gesture is detected, but may leverage detection of the gesture to control operations of the computing device 102.

In another example, the gesture module 122 employs the APIs 204 to expose a result that describes an operation that is to be performed by the computing device 102. In an implementation, this may be performed to identify the operation and even an amount to which the operation is to be performed. Further, this may be done so without indication of the gesture used to specify this operation. For example, a gesture 210 is illustrated as being performed by a hand 212 of the user 124 of FIG. 1 that mimics the turning of a physical knob. Detection of the gesture 210 by the 3D object detection system 120 includes positioning of fingers of the user's 124 hand 212 in three-dimensional space as well as detection of movement, which in this instance involves rotational movement to the left 214 or right 216.

The gesture module 122 accepts data as an input from the 3D object detection system 120 that describes this positioning and movement. This data is then compared with a gesture library 202 to recognize the gesture 210, an operation to be performed that corresponds to the gesture, and an amount to which this operation is to be performed. In the illustrated example, the gesture 210 is a media gesture 218 that is configured to adjust a level of volume for audio output. The level of volume is raised or lowered by rotating to the left 214 or right 216, respectively. Further, an amount of this rotation is used to define a corresponding amount of change in the level of volume, e.g., through a mapping defined as part of the gesture library 202.

Accordingly, based on this comparison the gesture module 122 may expose an operation to be controlled by the applications 206 to adjust a volume level by a specified amount for output by the input/output devices 208, e.g., speakers. Additionally, in one or more implementations the applications 206 are not aware of how this operation is initiated (e.g., a gesture), nor how the amount to perform the operation is specified. Accordingly, developers of the applications 206 may leverage this functionality efficiently without having to separately develop it.

Further, as this functionality may be shared with a plurality of applications 206 as well as across a variety of types of devices as described in relation to FIG. 1, the user 124 is provided with a consistent collection of gestures that perform as expected across these devices. For example, media gestures 218 may be defined as a gesture library 202 to control operations involving creation and/or rendering of media, such as digital images, digital audio, video, multimedia, and other types of digital content rendered by the computing device 102, such as haptic responses. Examples of such gestures include gestures that mimic interaction with a physical control (e.g., a knob or slider), interaction with the digital content itself (e.g., to mimic physical movement of a paper image), resizing, and so forth.

Likewise, user interface (UI) navigation gestures 220 may be defined to control operations involving navigation within a user interface. This may include pinch gestures to zoom a display of digital content, pan gestures to navigate directionally, scroll gestures, and so forth. Other gestures 222 may also be defined as part of the gesture library 202, e.g., for groups of gestures that correspond to operations that are common across different types of computing devices such as to specify particular user settings of the computing devices.

In this way, the user 124 is provided with consistent techniques to control operations of computing devices, such as to adjust volume of a computing device 102 using the same gesture regardless of whether the computing device 102 is configured as a wearable device 106, glasses 108, a housing configured to be held 110 by one or more hands of a user, a laptop 112 computer, a dedicated camera 114, incorporation of the computing device 102 as part of a vehicle 116 (e.g., plane, train, boat, aircraft, and balloon), as part of the "Internet-of-things" such as a thermostat 118, and so forth. The gestures may be detected using a variety of techniques, an example of which that includes use of RF signals is described in the following.

The 3D object detection system 120 represents functionality that wirelessly captures characteristics of a target object, illustrated here as a hand 212. In this example, 3D object detection system 120 is a hardware component of the computing device 102. In some cases, 3D object detection system 120 not only captures characteristics about the hand 212, but can additionally identify a specific gesture performed by the hand 212 from other gestures. Any suitable type of characteristic or gesture can be captured or identified, such as an associated size of the hand, a directional movement of the hand, a micro-gesture performed by all or a portion of the hand (e.g., a single-tap gesture, a double-tap gesture, a left-swipe, a forward-swipe, a right-swipe, a finger making a shape, etc.), and so forth. The term micro-gesture is used to signify a gesture that can be identified from other gestures based on differences in movement using a scale on the order of millimeters to sub-millimeters. Alternately or additionally, gesture component 104 can be configured to identify gestures on a larger scale than a micro-gesture (i.e., a macro-gesture that is identified by differences with a coarser resolution than a micro-gesture, such as differences measured in centimeters or meters).

A hand 212 of the user 124 represents a target object that the gesture component 104 is in process of detecting. Here, the hand 212 resides in free-space with no devices attached to it. Being in free-space, the hand 212 has no physical devices attached to it that couple to, or communicate with, computing device 102 and/or 3D object detection system 120. While this example is described in the context of detecting the hand 212, it is to be appreciated that 3D object detection system 120 can be used to capture characteristics of any other suitable type of target object, whether part or of separate from the user 124.

As part of this, the 3D object detection system 120 is configured to transmit and receive radio frequency (RF) signals. In an implementation, 3D object detection system 120 transmits the RF signals as radar signals, each on a respective antenna, that are directed towards hand 212. As the transmitted signals reach the hand 212, at least some reflect back to 3D object detection system 120 and are processed, as further described below. Signals detected by the 3D object detection system 120 can have any suitable combination of energy level, carrier frequency, burst periodicity, pulse width, modulation type, waveform, phase relationship, and so forth. In some cases, some or all of the respective signals transmitted in signals differs from one another to create a specific diversity scheme, such as a time diversity scheme that transmits multiple versions of a same signal at different points in time, a frequency diversity scheme that transmits signals using several different frequency channels, a space diversity scheme that transmits signals over different propagation paths, and so forth.

Figure 3:
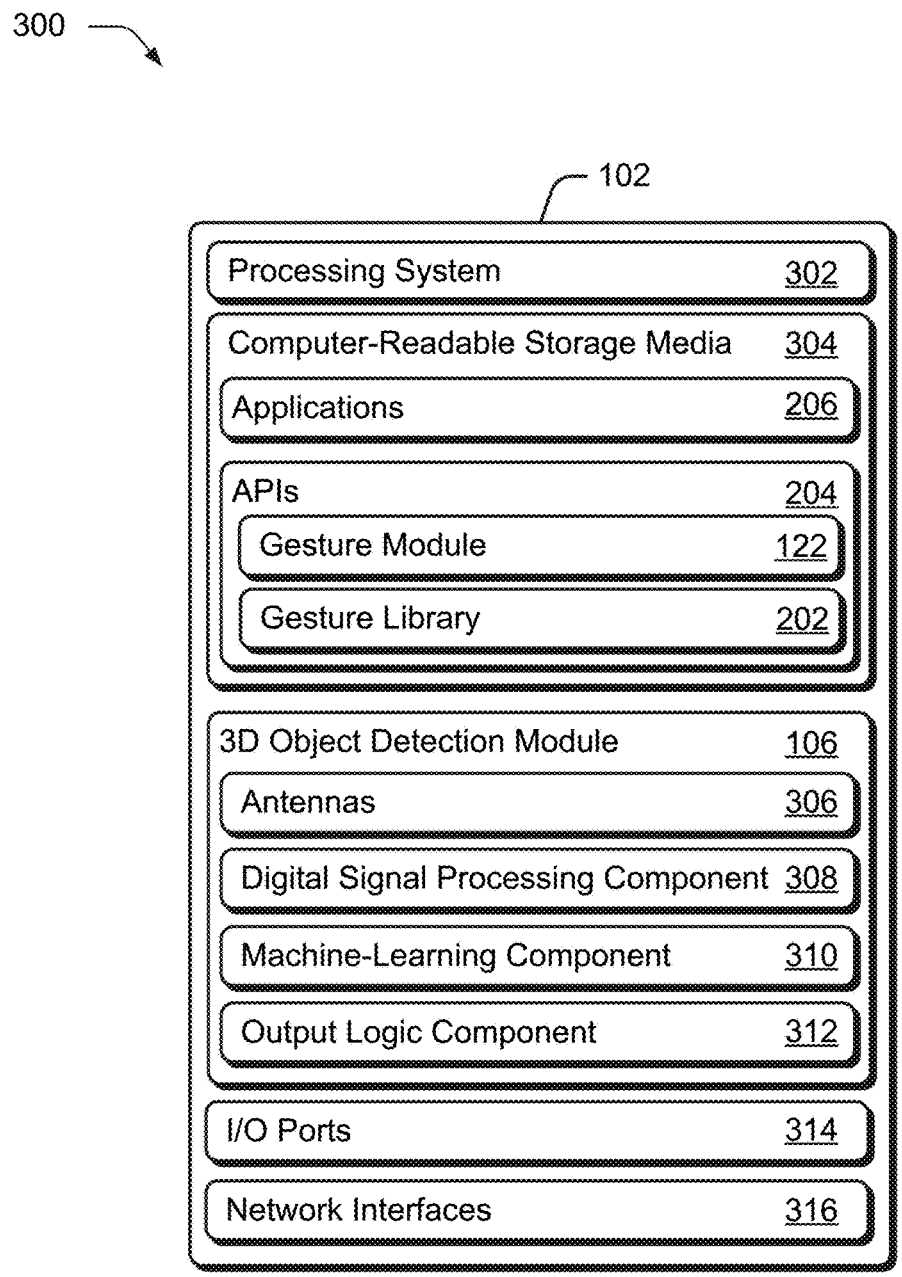
FIG. 3 illustrates an example implementation of a computing device of FIG. 2 in greater detail in accordance with one or more implementations.

Having generally described an environment in which wireless hand gesture detection may be implemented, now consider FIG. 3, which illustrates an example implementation 300 of computing device 102 of FIG. 2 in greater detail. The gesture component 104 is illustrated as implemented using the gesture module 122, gesture library 202, APIs 204, and 3D object detection system 106 as described in FIG. 2.

Computing device 102 includes a processing system 302 (e.g., processors, CPUs, GPUs) and computer-readable storage media 304. Applications 206 (e.g., media consumption, browsers, third-party applications, or an and/or an operating system) are embodied as computer-readable instructions on the computer-readable storage media 302 and are executed by the processing system 302 to perform operations.

Computer-readable storage media 204 also includes the Application Programming Interfaces (APIs) 204 to provide programming access into various routines and tools provided by the gesture component 104 of FIG. 2. In some implementations, APIs 204 provide high-level access into the gesture component 104 in order to abstract implementation details and/or hardware access from a calling application 206, request notifications related to identified events, query for results, and so forth. APIs 204 can also provide low-level access to gesture component 104, where a calling application 206 can control direct or partial hardware configuration of the gesture component 104. In some cases, APIs 204 provide programmatic access to input configuration parameters that configure transmit signals (i.e., signals as described in relation to FIG. 4) and/or select gesture recognition algorithms.

These APIs 204 enable applications 206 to incorporate the functionality provided by the gesture component 104 into executable code. For instance, applications 206 can call or invoke APIs 204 to register for, or request, an event notification when a particular gesture has been detected, enable or disable wireless gesture recognition in computing device 102, and so forth. At times, APIs 204 can access and/or include low level hardware drivers that interface with hardware implementations of gesture component 104. Alternately or additionally, APIs 204 can be used to access various algorithms that reside on gesture component 104 to perform additional functionality or extract additional information, such as 3D tracking information, angular extent, reflectivity profiles from different aspects, correlations between transforms/features from different channels, and so forth.

The 3D object detection system 106 and gesture module 122 of the gesture component 104 represent functionality that wirelessly detects a variety of gestures, such as micro-gestures performed by a hand 212 of FIG. 2. Gesture component 104 can be implemented as a chip embedded within computing device 102, e.g., as a single integrated circuit. However, it is to be appreciated that the gesture component 104 can be implemented in any other suitable manner, such as one or more Integrated Circuits (ICs), as a System-on-Chip (SoC), as a processor with embedded processor instructions or configured to access processor instructions stored in memory, as hardware with embedded firmware, a printed circuit board with various hardware components, or any combination thereof. Here, the 3D object detection system 106 includes antennas 306, digital signal processing component 308, machine-learning component 310, and output logic component 312. In some implementations, 3D object detection system 106 uses these various components in concert (such as a pipeline) to wirelessly detect gestures using radar techniques based on multiple signals, such as micro-gestures.

Antennas 306, for instance, are used transmit and receive RF signals. This is achieved by converting electrical signals into electromagnetic waves for transmission, and vice versa for reception. The 3D object detection system 106 can include any suitable number of antennas 306 in any suitable configuration. For instance, any of the antennas 306 can be configured as a dipole antenna, a parabolic antenna, a helical antenna, a monopole antenna, and so forth. In some examples, antennas 306 are constructed on-chip (e.g., as part of an SoC), while in other examples, antennas 306 are components, metal, hardware, and so forth that attach to the 3D object detection system 106. The placement, size, and/or shape of antennas 306 can be chosen to enhance a specific transmission pattern or diversity scheme, such as a pattern or scheme designed to capture information about a micro-gesture performed by the hand, as further described above and below. The antennas can be physically separated from one another by a distance that allows the 3D object detection system 106 to collectively transmit and receive signals directed to a target object (e.g., hand 212) over different channels, different radio frequencies, and different distances. In some instances, antennas 306 are spatially distributed to support triangulation techniques, while in others the antennas are collocated to support beamforming techniques. While not illustrated, each antenna can correspond to a respective transceiver path that physically routes and manages the outgoing signals for transmission and the incoming signals for capture and analysis.

Digital signal processing component 308 generally represents functionality that digitally captures and processes a signal. For instance, digital signal processing component 308 performs sampling on RF signals received by antennas 306 to generate digital samples that represent the RF signals, and processes the digital samples to extract information about the target object. Alternately or additionally, digital signal processing component 308 controls the configuration of signals transmitted via antennas 306, such as configuring a plurality of signals to form a specific diversity scheme, such as a beamforming diversity scheme. In some cases, digital signal processing component 308 receives input configuration parameters that control an RF signal's transmission parameters (e.g., frequency channel, power level, etc.), such as through APIs 204. In turn, digital signal processing component 308 modifies the RF signal based upon the input configuration parameter. At times, the signal processing functions of digital signal processing component 308 are included in a library of signal processing functions or algorithms that are also accessible and/or configurable via APIs 204, i.e., the gesture library 202. Digital signal processing component 308 can be implemented in hardware, software, firmware, or any combination thereof.

Among other things, machine-learning component 310 receives information processed or extracted by digital signal processing component 308, and uses that information to classify or recognize various aspects of the target object, as further described below. In some cases, machine-learning component 310 applies one or more algorithms to probabilistically determine which gesture has occurred given an input signal and previously learned gesture features by leveraging the gesture library 202. As in the case of digital-signal processing component 308, machine-learning component 310 can include a library of multiple machine-learning algorithms as part of the gesture library 202, such as a Random Forrest algorithm, deep learning algorithms (i.e. artificial neural network algorithms, convolutional neural net algorithms, etc.), clustering algorithms, Bayesian algorithms, and so forth.

Machine-learning component 310 can be trained on how to identify various gestures using input data that consists of example gestures to learn. In turn, machine-learning component 310 uses the input data to learn what features can be attributed to a specific gesture. These features are then used to identify when the specific gesture occurs. An operation may also be assigned to the gesture as part of the gesture library 202 as previously described to expose this operation via the APIs 204 to the applications 206 as previously described in relation to FIG. 2. In some examples, APIs 204 can be used to configure machine-learning component 310 and/or its corresponding algorithms.

Output logic component 312 represents functionality that uses logic to filter output information generated by digital signal processing component 308 and machine-learning component 310. In some cases, output logic component 312 uses knowledge about the target object to further filter or identify the output information. For example, consider a case where the target object is a hand repeatedly performing a tap gesture. Depending upon its configuration, output logic component 312 can filter the repeated tap gesture into a single output event indicating a repeated tap gesture, or repeatedly issue a single-tap gesture output event for each tap gesture identified. This can be based on knowledge of the target object, user input filtering configuration information, default filtering configuration information, and other information defined as part of the gesture library 202. In some implementations, the filtering configuration information of output logic component 312 can be modified via APIs 204.

Computing device 102 also includes I/O ports 314 and network interfaces 316. I/O ports 314 can include a variety of ports, such as by way of example and not limitation, high-definition multimedia (HDMI), digital video interface (DVI), display port, fiber-optic or light-based, audio ports (e.g., analog, optical, or digital), Universal Serial Bus (USB) ports, serial advanced technology attachment (SATA) ports, peripheral component interconnect (PCI) express based ports or card slots, serial ports, parallel ports, or other legacy ports. Computing device 102 may also include the network interfaces 316 for communicating data over wired, wireless, or optical networks. By way of example and not limitation, the network interfaces 316 may communicate data over a local-area-network (LAN), a wireless local-area-network (WLAN), a personal-area-network (PAN), a wide-area-network (WAN), an intranet, the Internet, a peer-to-peer network, point-to-point network, a mesh network, and the like.

Having described computing device 102 in accordance with one or more embodiments, now consider a discussion of using wireless detection of an object in accordance with one or more examples.

As technology advances, users have an expectation that new devices will provide additional freedoms and flexibility over past devices. One such example is the inclusion of wireless capabilities in a device. Consider the case of a wireless mouse input device. A wireless mouse input device receives input from a user in the format of button clicks and movement in position, and wirelessly transmits this information to a corresponding computing device. The wireless nature obviates the need to have a wired connection between the wireless mouse input device and the computing device, which gives more freedom to the user with the mobility and placement of the mouse. However, the user still physically interacts with the wireless mouse input device as a way to enter input into the computing device. Accordingly, if the wireless mouse input device gets lost or is misplaced, the user is unable to enter input with that mechanism. Thus, removing the need for a peripheral device as an input mechanism gives additional freedom to the user. One such example is performing input to a computing device via a hand gesture.

Gestures provide a user with a simple and readily available mechanism to input commands to a computing device. However, detection of some gestures, such as hand gestures, can pose certain problems. For example, attaching a movement sensing device to a hand does not remove a user's dependency upon a peripheral device. Instead, it is a solution that simply trades one input peripheral for another. As an alternative, cameras can capture images, which can then be compared and analyzed to identify the hand gestures. However, this option may not yield a fine enough resolution to detect micro-gestures. An alternate solution involves usage of radar systems to transmit RF signals to a target object, and determine information about that target based upon an analysis of the reflected signal.

Various implementations described herein are used to wirelessly detect gestures using multiple antennas 306. Each antenna 306 can be configured to transmit a respective RF signal to enable detection of a micro-gesture performed by a hand. In some implementation, the collective transmitted RF signals are configured to radiate a specific transmission pattern or specific diversity scheme. RF signals reflected off of the hand can be captured by the antenna, and further analyzed to identify temporal variations in the RF signals. In turn, these temporal variations can be used to identify micro-gestures.

Figure 4:
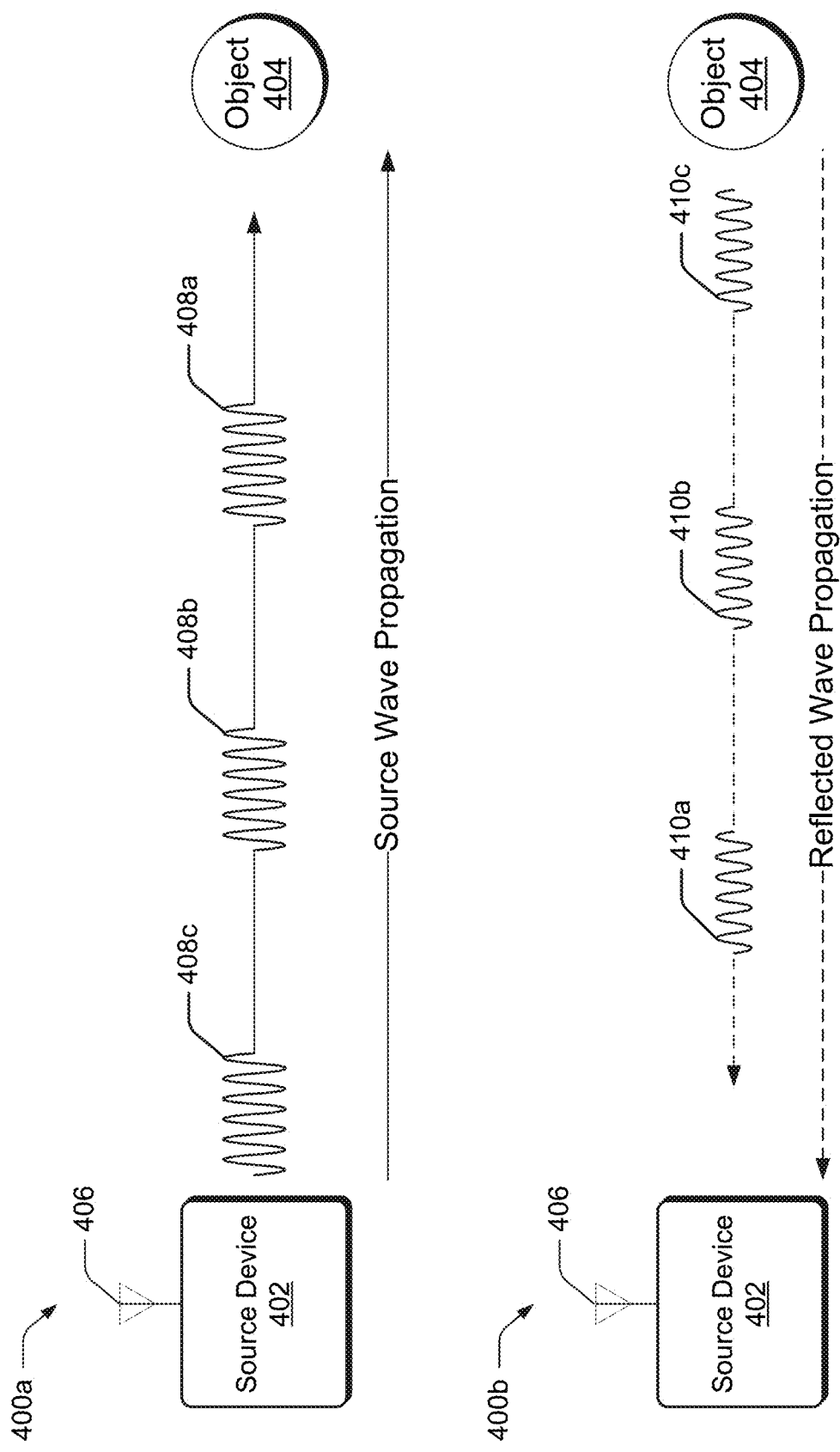
FIG. 4 illustrates an example of general signal properties.

Consider FIG. 4 which illustrates a simple example of RF wave propagation, and a corresponding reflected wave propagation. It is to be appreciated that the following discussion has been simplified, and is not intended to describe all technical aspects of RF wave propagation, reflected wave propagation, or detection techniques.

Environment 400a includes source device 402 and object 404. Source device 402 includes antenna 406, which is configured to transmit and receive electromagnetic waves in the form of an RF signal. In this example, source device 402 transmits a series of RF pulses, illustrated here as RF pulse 408a, RF pulse 408b, and RF pulse 408c. As indicated by their ordering and distance from source device 402, RF pulse 408a is transmitted first in time, followed by RF pulse 408b, and then RF pulse 408c. For discussion purposes, these RF pulses have the same pulse width, power level, and transmission periodicity between pulses, but any other suitable type of signal with alternate configurations can be transmitted without departing from the scope of the claimed subject matter.

Generally speaking, electromagnetic waves can be characterized by the frequency or wavelength of their corresponding oscillations. Being a form of electromagnetic radiation, RF signals adhere to various wave and particle properties, such as reflection. When an RF signal reaches an object, it will undergo some form of transition. Specifically, there will be some reflection off the object. Environment 400b illustrates the reflection of RF pulses 408a-408c reflecting off of object 404, where RF pulse 410a corresponds to a reflection originating from RF pulse 408a reflecting off of object 404, RF pulse 410b corresponds to a reflection originating from RF pulse 410b, and so forth. In this simple case, source device 402 and object 404 are stationary, and RF pulses 408a-408c are transmitted via a single antenna (antenna 406) over a same RF channel, and are transmitted directly towards object 404 with a perpendicular impact angle. Similarly, RF pulses 410a-410c are shown as reflecting directly back to source device 402, rather than with some angular deviation. However, as one skilled in the art will appreciate, these signals can alternately be transmitted or reflected with variations in their transmission and reflection directions based upon the configuration of source device 402, object 404, transmission parameters, variations in real-world factors, and so forth.

Upon receiving and capturing RF pulses 410a-410c, source device 402 can then analyze the pulses, either individually or in combination, to identify characteristics related to object 404. For example, source device 402 can analyze all of the received RF pulses to obtain temporal information and/or spatial information about object 404. Accordingly, source device 402 can use knowledge about a transmission signal's configuration (such as pulse widths, spacing between pulses, pulse power levels, phase relationships, and so forth), and further analyze a reflected RF pulse to identify various characteristics about object 404, such as size, shape, movement speed, movement direction, surface smoothness, material composition, and so forth.

Figure 5:
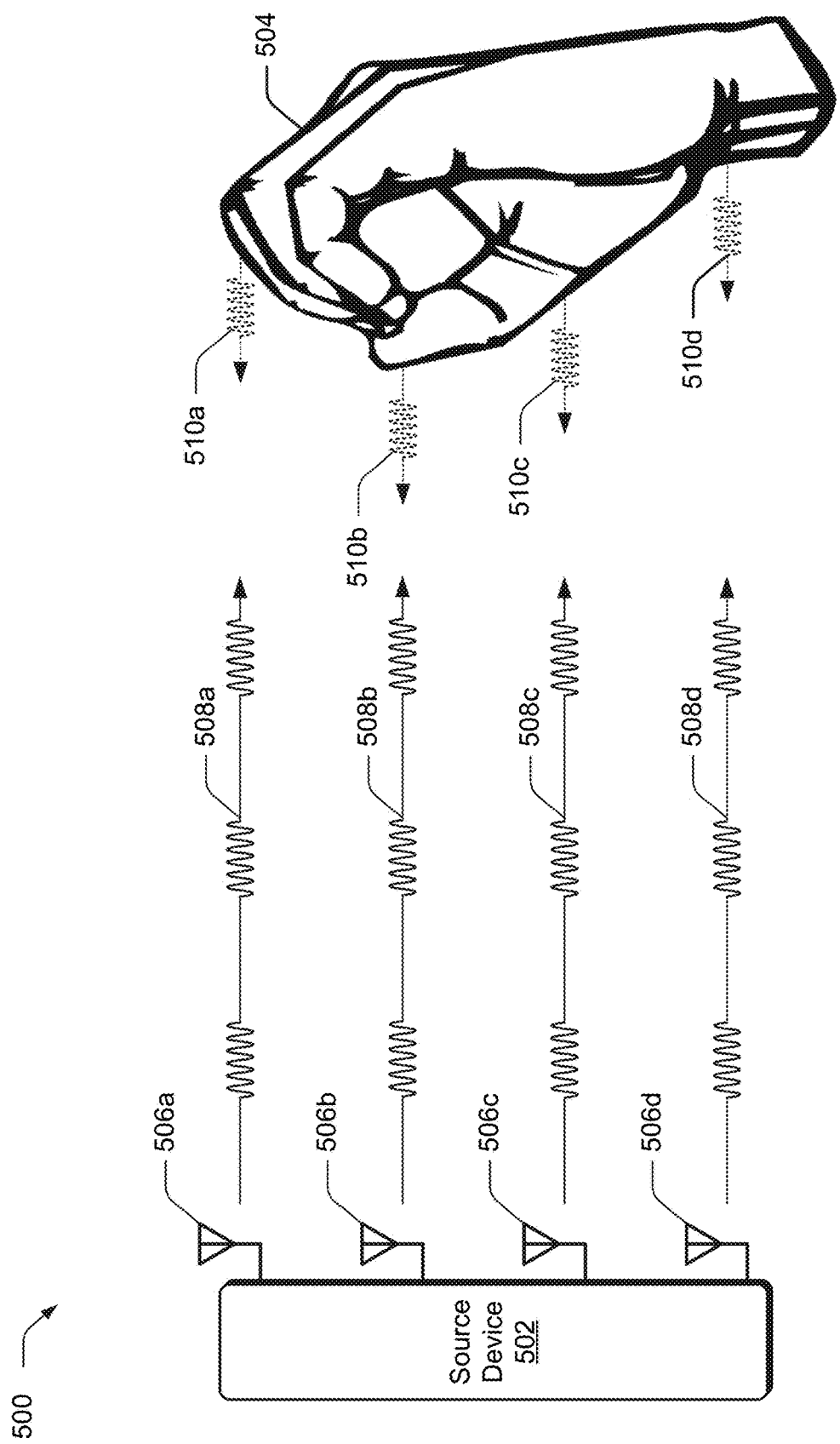
FIG. 5 illustrates an example of general signal properties.

Now consider FIG. 5, which builds upon the above discussion of FIG. 4. FIG. 5 illustrates example environment 500 in which multiple antenna are used to ascertain information about a target object. Environment 500 includes source device 502 and a target object, shown here as hand 504. Generally speaking, source device 502 includes antennas 506a-506d to transmit and receive multiple RF signals. In some embodiments, source device 502 includes gesture component 104 of FIGS. 1-3 and antennas 506a-506d correspond to antennas 210. While source device 502 in this example includes four antennas, it is to be appreciated that any suitable number of antennas can be used. Each antenna of antennas 506a-506d is used by source device 502 to transmit a respective RF signal (e.g., antenna 506a transmits RF signal 508a, antenna 506b transmits RF signal 508b, and so forth). As discussed above, these RF signals can be configured to form a specific transmission pattern or diversity scheme when transmitted together. For example, the configuration of RF signals 508a-508d, as well as the placement of antennas 506a-506d relative to a target object, can be based upon beamforming techniques to produce constructive interference or destructive interference patterns, or alternately configured to support triangulation techniques. At times, source device 502 configures RF signals 508a-508d based upon an expected information extraction algorithm, as further described below.

When RF signals 508a-508d reach a hand 504, the signals generate reflected RF signals 510a-510d. Similar to the discussion of FIG. 4 above, source device 502 captures these reflected RF signals, and then analyzes them to identify various properties or characteristics of hand 504, such as a micro-gesture. For instance, in this example, RF signals 508a-508d are illustrated with the bursts of the respective signals being transmitted synchronously in time. In turn, and based upon the shape and positioning of hand 504, reflected signals 510a-510d return to source device 502 at different points in time (e.g., reflected signal 510b is received first, followed by reflected signal 510c, then reflected signal 510a, and then reflected signal 510d). Reflected signals 510a-510d can be received by source device 502 in any suitable manner. For example, antennas 506a-506d can each receive all of reflected signals 510a-510d, or receive varying subset combinations of reflected signals 510a-510d (i.e. antenna 506a receives reflected signal 510a and reflected signal 510d, antenna 506b receives reflected signal 510a, reflected signal 510b, and reflected signal 510c, etc.). Thus, each antenna can receive reflected signals generated by transmissions from another antenna. By analyzing the various return times of each reflected signal, source device 502 can determine shape and corresponding distance information associated with hand 504. When reflected pulses are analyzed over time, source device 502 can additionally discern movement. Thus, by analyzing various properties of the reflected signals, as well as the transmitted signals, various information about hand 504 can be extracted, as further described below. It is to be appreciated that the above example has been simplified for discussion purposes, and is not intended to be limiting.

As in the case of FIG. 4, FIG. 5 illustrates RF signals 508a-508d as propagating at a 90° angle from source device 502 and in phase with one another. Similarly, reflected signals 510a-510d each propagate back at a 90° angle from hand 504 and, as in the case of RF signals 508a-508d, are in phase with one another. However, as one skilled in the art will appreciate, more complex transmission signal configurations, and signal analysis on the reflected signals, can be utilized, examples of which are provided above and below. In some embodiments, RF signals 508a-508d can each be configured with different directional transmission angles, signal phases, power levels, modulation schemes, RF transmission channels, and so forth. These differences result in variations between reflected signals 510a-510d. In turn, these variations each provide different perspectives of the target object which can be combined using data fusion techniques to yield a better estimate of hand 504, how it is moving, its three dimensional (3D) spatial profile, a corresponding micro-gesture, and so forth.

Having described general principles of RF signals which can be used in gesture detection, now consider a discussion of various forms of information extraction that can be employed in accordance with one or more embodiments.

Wireless Detection of Gestures

The above discussion describes simple examples of RF signal transmission and reflection. In the case of using multiple antenna, it can be seen how transmitting a plurality of RF signals that have variations from one another results in receiving diverse information about a target object from the corresponding reflected signals. The diverse information can then be combined to improve detecting a characteristic or gesture associated with the target object. Accordingly, the system as a whole can exploit or optimize which signals are transmitted to improve the amount of information that can be extracted from the reflected signals. Some embodiments of a gesture sensor component capture raw data representative of signals reflected off a target object. In turn, digital-signal processing algorithms extract information from the raw data, which can then be fed to a machine-learning algorithm to classify a corresponding behavior of the target object. At times, the gesture sensor component utilizes a pipeline to identify or classify a gesture.

Figure 6:
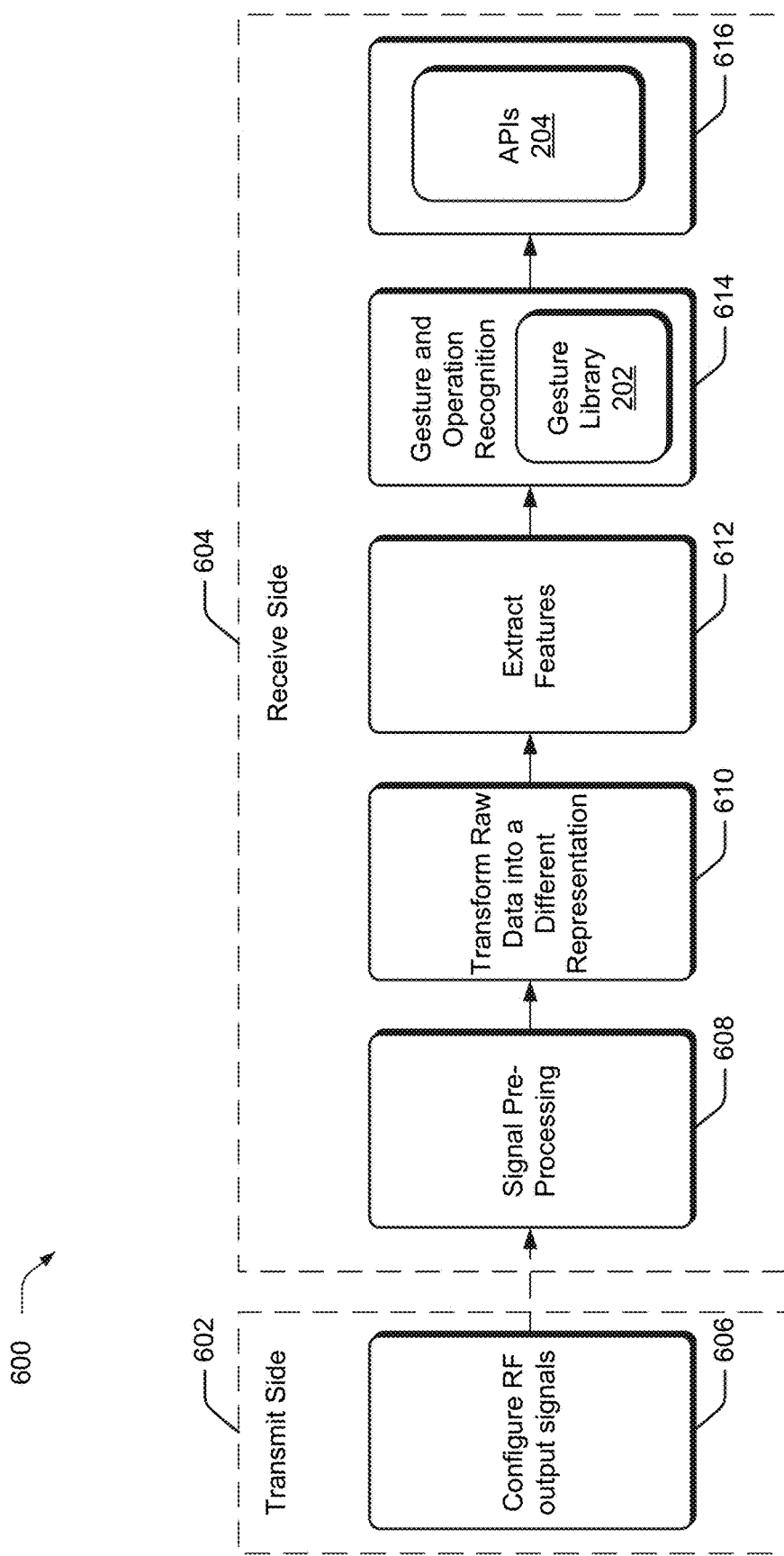
FIG. 6 illustrates an example of a pipeline in accordance with one or more implementations.

FIG. 6 illustrates the various stages employed by an example pipeline 600 to identify gestures and expose operations to be controlled by those gestures to applications. In some implementations, pipeline 600 can be implemented by various components of gesture component 104 of FIGS. 1-3, such as antennas 210, digital signal processing component 212, machine-learning component 310, and/or output logic component 312. It is to be appreciated that these stages have been simplified for discussion purposes, and are not intended to be limiting.

From one viewpoint, the stages can be grouped into two classifications: transmit side functionality 602 and receive side functionality 604. Generally speaking, the transmit side functionality in the pipeline does not feed directly into the receive side functionality. Instead, the transmit side functionality generates transmit signals which contribute to the reflected signals captured and processed by the receive side functionality, as further described above. Accordingly, the relationship between the transmit side functionality and the receive side functionality is indicated in pipeline 600 through the use of a dotted line to connect stage 606 of the pipeline with stage 608, rather than a solid line, since in various embodiments they are not directly connected with one another.

Stage 606 of the pipeline configures the RF transmit signals. In some cases, various transmission parameters are determined in order to generate the RF transmit signals. At times, the transmission parameters can be based upon an environment in which they are being used. For instance, the transmission parameters can be dependent upon a number of antenna available, the types of antenna available, a target object being detected, directional transmission information, a requested detection resolution, a long range object detection mode, a short range object detection mode, an expected receive-side digital signal processing algorithm, an expected receive-side machine-learning algorithm, physical antenna placement, and so forth. As noted above, the configuration of the RF transmit signals can be dependent upon an expected analysis on the receive side. Thus, the configuration of the RF transmit signals can change to support triangulation location detection methods, beamforming detection methods, and so forth. In some examples, the transmission parameters are automatically selected or loaded at startup (e.g., the RF transmit signal configurations are fixed). In other examples, these parameters are modifiable, such as through APIs 204.

At the start of receive side functionality 604, stage 608 performs signal pre-processing on raw data. For example, as an antenna receives reflected signals (e.g., antennas 506a-506d receiving some or all of reflected signals 510a-510d of FIG. 5), some instances sample the signals and generate a digital representation of the raw incoming signals. Upon generating the raw data, stage 608 performs pre-processing to clean up the signals or generate versions of the signals in a desired frequency band, or in a desired format. In some cases, pre-processing includes filtering the raw data to reduce a noise floor or remove aliasing, resampling the data to obtain to a different sample rate, generating a complex representation of the signal(s), and so forth. In some cases, stage 608 automatically pre-processes the raw data based upon default parameters, while in other cases the type of pre-processing is modifiable, such as through APIs 204.

Stage 610 transforms the received signal data into one or more different representations. Here, the signals pre-processed by stage 608 are fed into stage 610. At times, stage 610 combines data from multiple paths (and corresponding antenna). The combined data can be any combination of "transmit paths", "receive paths", and "transmit and receive paths". Any suitable type of data fusion technique can be used, such as weighted integration to optimize a heuristic (e.g., signal-to-noise (SNR) ratio, minimum mean square error (MMSE), etc.), beamforming, triangulation, and so forth. All respective paths can be combined together, or various sub-combinations of paths can be made, to generate combined signal data.

In some implementations, stage 610 generates multiple combinations of signal data for different types of feature extraction, and/or transforms the signal data into another representation as a precursor to feature extraction. For example, some embodiments process the combined signal data to generate a three dimensional (3D) spatial profile of the target object. However, any suitable type of algorithm can be used to generate a transformed view or version of the raw data, such as an I/Q transformation that yields a complex vector containing phase and amplitude information related to the target object, a beamforming transformation that yields a spatial representation of target objects within range of a gesture sensor device, a Range-Doppler algorithm that yields target velocity and direction, a Range profile algorithm that yields target recognition information, a Micro-Doppler algorithm that yields high-resolution target recognition information, a Spectogram algorithm that yields a visual representation of the corresponding frequencies, and so forth.

As described above, raw data can be processed in several ways to generate several transformations or combined signal data. At times, the same data can be analyzed or transformed in multiple ways. For instance, a same capture of raw data can be processed to generate a three-dimensional profile, target velocity information, and target directional movement information. In addition to generating transformations of the raw data, stage 610 can perform basic classification of the target object, such as identifying information about its presence, a shape, a size, an orientation, a velocity over time, and so forth. For example, some implementations use stage 610 to identify a basic orientation of a hand by measuring an amount of reflected energy off of the hand over time. These transformations and basic classifications can be performed in hardware, software, firmware, or any suitable combination. At times, the transformations and basic classifications are performed by digital signal processing component 308 and/or machine-learning component 310 of FIG. 3. In some cases, stage 610 automatically transforms the raw data or performs a basic classification based upon default parameters, while in other cases the transformations or classifications are modifiable, such as through APIs 204.

Stage 612 receives the transformed representation of the data from stage 610, and extracts or identifies features using the data. At times, feature extraction builds upon a basic classification identified in stage 610. Consider the above example in which stage 610 classifies a target object as a hand Stage 612 can build from this basic classification to extract lower resolution features of the hand In other words, if stage 612 is provided information identifying the target object as a hand, then stage 612 uses this knowledge to look for hand-related features (e.g., finger tapping, shape gestures, swipe movements, etc.) instead of head-related features, (e.g., an eye blink, mouthing a word, a head-shaking movement, etc.).

As another example, consider a scenario where stage 610 transforms the raw signal data into a measure of the target object's velocity-over-time. In turn, this information can used by stage 612 to identify a finger fast-tap motion by using a threshold value to compare the target object's velocity of acceleration to the threshold value, a slow-tap feature, and so forth. Any suitable type of algorithm can be used to extract a feature, such as machine-learning algorithms implemented by machine-learning component 310, and/or digital signal processing algorithms implemented by digital signal processing component 308 of FIG. 3. Some implementations simply apply a single algorithm to extract, identify, or classify a feature, while other embodiments apply multiple algorithms to extract a single feature or multiple features. Thus, different algorithms can be applied to extract different types of features on a same set of data, or different sets of data. In some cases, stage 612 searches for a default feature using default algorithms, while in other cases the applied algorithms and/or the feature being searched for is modifiable, such as through APIs 204.

Using feature extraction information generated by stage 612, stage 614 performs gesture recognition using a gesture library 202. For instance, consider a case where a finger tap feature has been extracted. Stage 614 uses this information and compares it to descriptions of gestures to identify the feature as a double-click micro-gesture. At times, gesture recognition can be a probabilistic determination of which gesture has most likely occurred based upon the input information and how this information relates to one or more previously learned characteristics or features of various gestures. For example, a machine-learning algorithm can be used to determine how to weight various received characteristics to determine a likelihood these characteristics correspond to particular gestures (or components of the gestures). As in the case above, some implementations apply a single algorithm to recognize a gesture, while other embodiments apply multiple algorithms to identify a single gesture or multiple gestures. This can include micro-gestures or macro-gestures. Further, any suitable type of algorithm can be used to identify a gesture, such as machine-learning algorithms implemented by machine-learning component 310, and/or digital signal processing algorithms implemented by digital signal processing component 308 of FIG. 3. In some examples, stage 614 uses default algorithms to identify a gesture, while in other cases the applied algorithms and/or the gesture being identified is modifiable, such as through APIs 204.

From the identified gesture, stage 614 may also identify an operation that corresponds to the gesture and even a degree to which the gesture is to be performed for operations having quantitative features. The gesture library 202, for instance, may map the gestures to respective operations to be performed upon detection of the gesture. This may also be used to map amounts that are to be used to perform the operations, such as to raise or lower volume, a scrolling amount, and so forth. Stage 616 then exposes an indication of this operation, as well as the mapped amount as appropriate, via the APIs 204 for receipt by the applications 206 of FIG. 2. The applications 206 may then control performance of the operations of the computing device 102, e.g., to initiate or continue an operation, set an amount in which to perform an operation, and so forth.

Pipeline 600 provides an ability to detect gestures, e.g., micro-gestures or macro-gestures. This can include movements based on portions of a target object, rather than the whole target object. Consider again the example case of a target object that is a hand. On a whole, the hand, or portions of the hand, can be in a stationary position while other portions of the hand, such as one or more fingers, are moving. The above described techniques can be used to not only identify a stationary hand, but portions of the hand that are moving, such as two fingers rubbing together. Thus, a micro-gesture can entail identifying a first portion of the hand as being stationary, and identifying a second portion of the hand as having movement relative to the stationary portion.

Figure 7:
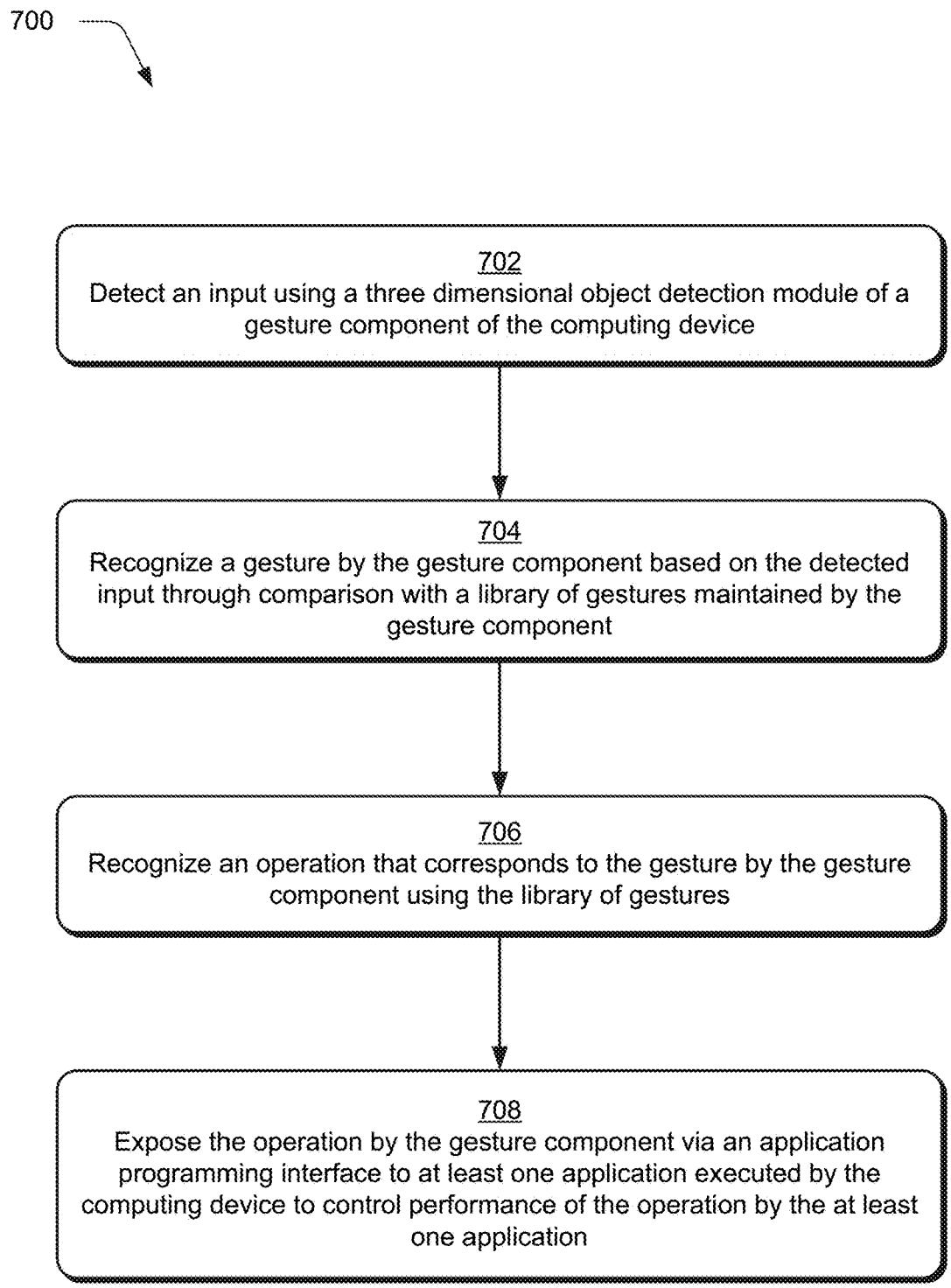
FIG. 7 illustrates an example flow diagram in accordance with one or more implementations.

FIG. 7 is a flow diagram depicting a procedure 700 in an example implementation. The following discussion describes techniques that may be implemented utilizing the previously described systems and devices. Aspects of each of the procedure may be implemented in hardware, firmware, software, or a combination thereof, such gesture component 104 of FIGS. 1-6. The procedure is shown as a set of blocks that specify operations performed by one or more devices and are not necessarily limited to the orders shown for performing the operations by the respective blocks. In portions of the following discussion, reference will be made to FIGS. 1-6.

An input is detected using a three dimensional object detection system of a gesture component of the computing device (block 702). The inputs may detect an object, such as a part of a user 124, a physical object associated with a user 124, as well as objects in a physical environment, in which, the user 124 is disposed.

A gesture is recognized by the gesture component based on the detected input through comparison with a library of gestures maintained by the gesture component (block 704). A gesture module 122, for instance, may compare the inputs from the 3D object detection system 120 with a gesture library 202 to determine which gesture corresponds with the input, if any. An operation is then recognized that corresponds to the gesture by the gesture component using the library of gestures (block 706). The gesture, for instance, may be associated with a corresponding operation within the gesture library 202. This may also be associated with a mapping that defines a degree to which the operation is to be performed based on performance of the gesture, e.g., an amount of rotational or other movement of a hand of the user 124.

The operation is exposed by the gesture component via an application programming interface to at least one application executed by the computing device to control performance of the operation by the at least one application (block 708). Continuing with the above example, this may include identification of the operation and an amount to which the operation is to be performed. The operation is then performed by the computing device 102 through execution of the application 206.

Having considered various embodiments, consider now an example system and device that can be utilized to implement the embodiments described above.

Example Computing Device

Figure 8:
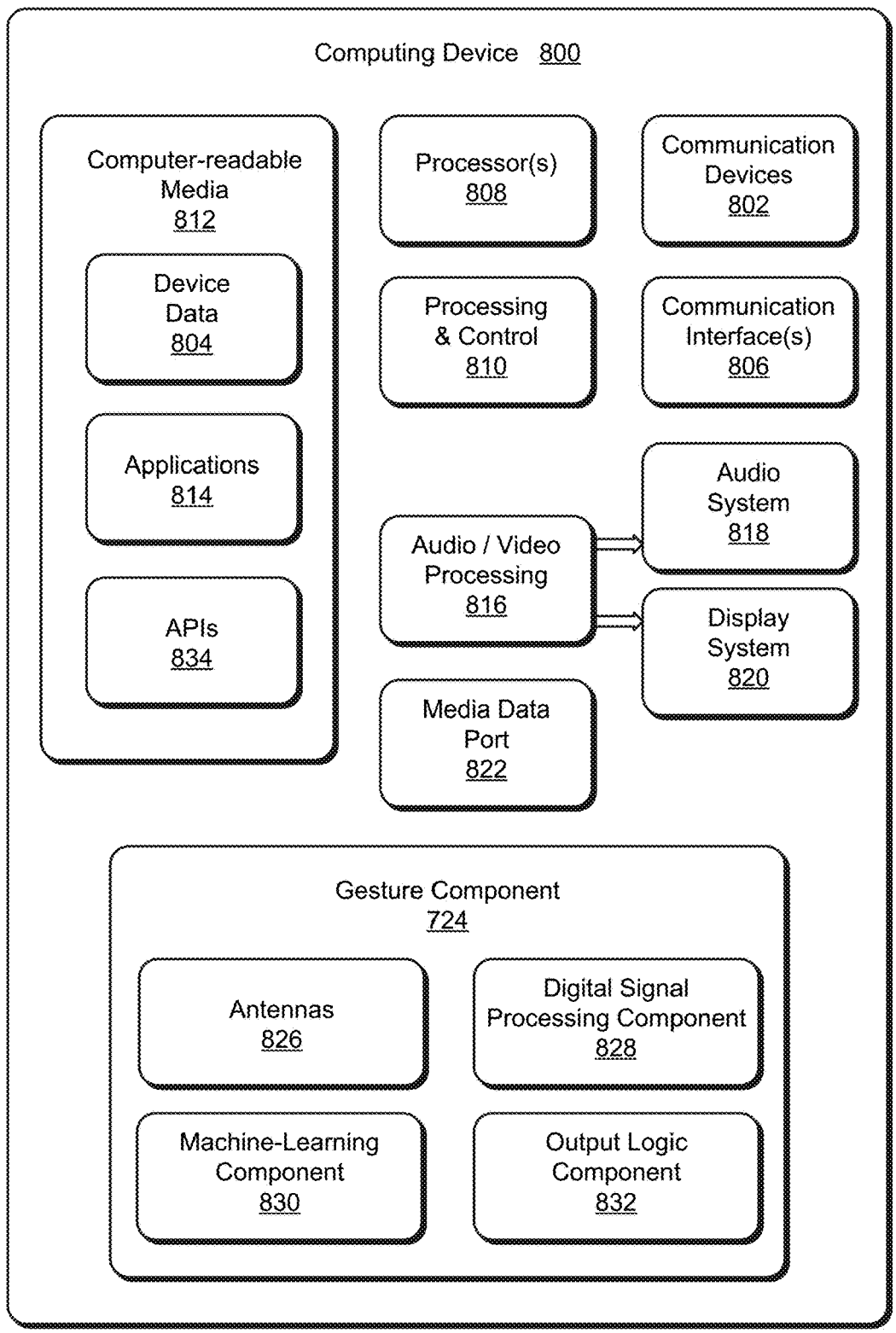
FIG. 8 illustrates an example device in which gesture detection can be employed in accordance with one or more implementations.

FIG. 8 illustrates various components of an example computing device 800 that incorporates micro-gesture recognition using wireless techniques as describe with reference to FIGS. 1-7. Computing device 800 may be implemented as any type of a fixed or mobile device, in any form of a consumer, computer, portable, user, communication, phone, navigation, gaming, audio, camera, messaging, media playback, and/or other type of electronic device, such as computing device 102 described with reference to FIGS. 1-3. In light of this, it is to be appreciated that various alternate embodiments can include additional components that are not described, or exclude components that are described, with respect to computing device 800.

Computing device 800 includes communication devices 802 that enable wired and/or wireless communication of device data 804 (e.g., received data, data that is being received, data scheduled for broadcast, data packets of the data, etc.). The device data 804 or other device content can include configuration settings of the device and/or information associated with a user of the device.

Computing device 800 also includes communication interfaces 806 that can be implemented as any one or more of a serial and/or parallel interface, a wireless interface, any type of network interface, a modem, and as any other type of communication interface. The communication interfaces 806 provide a connection and/or communication links between computing device 800 and a communication network by which other electronic, computing, and communication devices communicate data with computing device 800.

Computing device 800 includes one or more processors 808 (e.g., any of microprocessors, controllers, and the like) which process various computer-executable instructions to control the operation of computing device 800 and to implement embodiments of the techniques described herein. Alternatively or in addition, computing device 800 can be implemented with any one or combination of hardware, firmware, or fixed logic circuitry that is implemented in connection with processing and control circuits which are generally identified at 810. Although not shown, computing device 800 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Computing device 800 also includes computer-readable media 812, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like.

An implementation of the described modules and techniques may be stored on or transmitted across some form of computer-readable media. The computer-readable media may include a variety of media that may be accessed by the computing device 800. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 800, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

Computer-readable media 812, when configured as computer-readable storage media, provides data storage mechanisms to store the device data 804, as well as various applications 814 and any other types of information and/or data related to operational aspects of computing device 800. The applications 814 can include a device manager (e.g., a control application, software application, signal processing and control module, code that is native to a particular device, a hardware abstraction layer for a particular device, etc.).

Computing device 800 also includes audio and/or video processing system 816 that processes audio data and/or passes through the audio and video data to audio system 818 and/or to display system 820 (e.g., a screen of a smart phone or camera). Audio system 818 and/or display system 820 may include any devices that process, display, and/or otherwise render audio, video, display, and/or image data. Display data and audio signals can be communicated to an audio component and/or to a display component via an RF link, S-video link, HDMI, composite video link, component video link, DVI, analog audio connection, or other similar communication link, such as media data port 822. In some implementations, audio system 818 and/or display system 820 are external components to computing device 800. Alternatively or additionally, display system 820 can be an integrated component of the example electronic device, such as part of an integrated touch interface.

Computing device 800 also includes gesture component 824 that wirelessly identifies one or more features of a target object, such as a micro-gesture performed by a hand as further described above. Gesture component 824 can be implemented as any suitable combination of hardware, software, firmware, and so forth. In some embodiments, gesture component 824 is implemented as an SoC. Among other things, gesture component 824 includes antennas 826, digital signal processing component 828, machine-learning component 830, and output logic component 832.

Antennas 826 transmit and receive RF signals under the control of gesture sensor component. Each respective antenna of antennas 826 can correspond to a respective transceiver path internal to gesture sensor component 824 that physical routes and manages outgoing signals for transmission and the incoming signals for capture and analysis as further described above.

Digital signal processing component 828 digitally processes RF signals received via antennas 826 to extract information about the target object. This can be high-level information that simply identifies a target object, or lower level information that identifies a particular micro-gesture performed by a hand. In some embodiments, digital signal processing component 828 additionally configures outgoing RF signals for transmission on antennas 826. Some of the information extracted by digital signal processing component 828 is used by machine-learning component 830. Digital signal processing component 828 at times includes multiple digital signal processing algorithms that can be selected or deselected for an analysis, examples of which are provided above. Thus, digital signal processing component 828 can generate key information from RF signals that can be used to determine what gesture might be occurring at any given moment.

Machine-learning component 830 receives input data, such as a transformed raw signal or high-level information about a target object, and analyzes the input date to identify or classify various features contained within the data. As in the case above, machine-learning component 830 can include multiple machine-learning algorithms that can be selected or deselected for an analysis. Among other things, machine-learning component 830 can use the key information generated by digital signal processing component 828 to detect relationships and/or correlations between the generated key information and previously learned gestures to probabilistically decide which gesture is being performed.

Output logic component 832 logically filters output information generated by digital signal processing component 828 and/or machine-learning component 830. Among other things, output logic component 832 identifies when received information is redundant, and logically filters the redundancy out to an intended recipient.

Computing device 800 also includes APIs 834, which are illustrated as being embodied on computer-readable media 812. APIs 834 provide programmatic access to gesture sensor component 824, examples of which are provided above. The programmatic access can range from high-level program access that obscures underlying details of how a function is implemented, to low-level programmatic access that enables access to hardware. In some cases, APIs 834 can be used to send input configuration parameters associated with modifying operation of digital signal processing component 828, machine-learning component 830, output logic component 832, or any combination thereof, examples of which are provided above.

Although the embodiments have been described in language specific to structural features and/or methodological acts, it is to be understood that the various embodiments defined in the appended claims are not necessarily limited to the specific features or acts described. Rather, the specific features and acts are disclosed as example forms of implementing the various embodiments.

What is claimed is:

1. A method of controlling operation of a computing device based on gesture detection, the method comprising:
   detecting, by a three-dimensional object detection module of a gesture component of the computing device, an input based on received radar signals that have been reflected off of an object;
   transforming, by the gesture component, raw data of the radar signals into one or more different representations that represent shape information about the object;
   extracting, by the gesture component, three-dimensional feature information about the object from the transformed raw data of the radar signals;
   recognizing, by the gesture component, a three-dimensional gesture performed by the object, the recognizing based on a comparison of the extracted feature information about the object from the radar signals with a library of gestures maintained by the gesture component;
   recognizing, by the gesture component, an operation that corresponds to the three-dimensional gesture using the library of gestures; and
   exposing, by the gesture component, an indication of the operation by the gesture component via an application programming interface for receipt by at least one application executed by the computing device to cause the at least one application to control performance of the operation.

2. The method of claim 1, wherein the radar signals comprise radio signals.

3. The method of claim 2, wherein the radar signals correspond to a frequency band included as part of a Wi-Fi radio spectrum.

4. The method of claim 1, wherein the at least one application is not made aware through the application program interface as to how the operation is detected by the three-dimensional object detection module.

5. The method of claim 1, wherein the library of gestures includes media gestures usable by the at least one application to control rendering of media.

6. The method of claim 1, wherein the library of gestures includes user interface navigation gestures usable by the at least one application to control navigation within a user interface.

7. The method as described in claim 1, wherein the three-dimensional object detection module and the gesture library of the gesture component are implemented via a single integrated circuit.

8. The method of claim 1, wherein the shape information about the object comprises a classification of the object such as a hand, a finger, or a head; and
   wherein the extracting the three-dimensional feature information about the object comprises looking for three-dimensional feature information specific to the classification of the object.

9. A computing device comprising:
   a processing system;
   an application maintained in computer-readable storage media and executable by the processing system to perform a plurality of operations; and
   a gesture component implemented at least partially in hardware, the gesture component including:
      a three-dimensional object detection module configured to detect an input involving orientation or movement of an object in three-dimensional space, the detection based on received radar signals that have been reflected by the object; and
      a gesture module configured to:
         maintain a library of gestures;
         transform raw data corresponding to the radar signals into one or more different representations that represent shape information about the object;
         extract three-dimensional feature information about the object from the transformed raw data of the radar signals;
         compare the three-dimensional feature information about the object from the transformed raw data of the radar signals with the library of gestures;
         recognize a gesture performed by the object based on the comparison; and
         expose an indication of at least one said operation that corresponds to the recognized gesture via an application programming interface for receipt by at least one application to cause the at least one application to control performance of the at least one said operation.

10. The computing device of claim 9, wherein the radar signals comprise radio waves.

11. The computing device of claim 10, wherein the radio waves correspond to a frequency band included as part of a Wi-Fi radio spectrum.

12. The computing device of claim 9, wherein the at least one application is not made aware through the application program interface as to how the at least one said operation is detected by the three-dimensional object detection module.

13. The computing device of claim 9, wherein the library of gestures includes media gestures usable by the at least one application to control output of media.

14. The computing device of claim 9, wherein the library of gestures includes user interface navigation gestures usable by the at least one application to control navigation within a user interface.

15. The computing device of claim 9, wherein the three-dimensional object detection module and the gesture library of the gesture component are implemented via a single integrated circuit.

16. The computing device of claim 9, wherein the shape information about the object comprises a classification of the object such as a hand, a finger, or a head; and
   wherein the extracting the three-dimensional feature information about the object comprises looking for three-dimensional feature information specific to the classification of the object.

17. A method of controlling operation of a computing device based on gesture detection, the method comprising:
   transmitting a plurality of outgoing radio frequency radar signals by a gesture component;
   capturing incoming radio frequency radar signals generated by the plurality of outgoing radio frequency radar signals as reflecting off a user;
   generating an input by the gesture component from the captured incoming radio frequency radar signals, the input generated by:
   transforming raw data corresponding to the incoming radio frequency radar signals into one or more different representations that represent shape information about one or more portions of the user;
   extracting three-dimensional feature information about the one or more portions of the user;
   comparing the three-dimensional feature information about the one or more portions of the user with a library of gestures maintained by the gesture component;
   recognizing a gesture performed by the one or more portions of the user based on the comparison; and
   exposing an indication of at least one operation that corresponds to the recognized gesture by the gesture component via an application programming interface for receipt by at least one application executed by the computing device to cause the at least one application to control performance of the at least one operation.

18. The method of claim 17, wherein the radio frequency radar signals correspond to a frequency band included as part of a Wi-Fi radio spectrum.

19. The method of claim 17, wherein the library of gestures includes media gestures usable by the at least one application to control output of media or user interface navigation gestures usable by the at least one application to control navigation within a user interface.

20. The method of claim 17, wherein the shape information about the one or more portions of the user comprises one or more body parts of the user such as a hand, a finger, or a head; and
   wherein the extracting the three-dimensional feature information about the one or more portions of the user comprises looking for three-dimensional feature information specific to the one or more body parts of the user.

* * * * *